(12) United States Patent
Matsuo et al.

(10) Patent No.: US 8,953,010 B2
(45) Date of Patent: Feb. 10, 2015

(54) LIGHT SCANNING DEVICE AND IMAGE FORMING APPARATUS

(71) Applicant: Sharp Kabushiki Kaisha, Osaka (JP)

(72) Inventors: Manabu Matsuo, Osaka (JP); Ryosuke Sasaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/682,839

(22) Filed: Nov. 21, 2012

(65) Prior Publication Data

US 2013/0141506 A1 Jun. 6, 2013

(30) Foreign Application Priority Data

Dec. 2, 2011 (JP) .................................. 2011-264807
Dec. 16, 2011 (JP) .................................. 2011-275782

(51) Int. Cl.
| | |
|---|---|
| B41J 15/14 | (2006.01) |
| B41J 27/00 | (2006.01) |
| G03G 13/04 | (2006.01) |
| G02B 7/02 | (2006.01) |
| G03G 15/04 | (2006.01) |
| G03G 15/043 | (2006.01) |
| G02B 27/12 | (2006.01) |

(52) U.S. Cl.
CPC ................ G03G 13/04 (2013.01); G02B 7/023 (2013.01); G03G 15/04045 (2013.01); G03G 15/0435 (2013.01); G02B 27/123 (2013.01)
USPC .......................................... 347/242; 347/257

(58) Field of Classification Search
USPC .................. 347/230, 241–245, 256–258, 263
See application file for complete search history.

(56) References Cited

U.S. PATENT DOCUMENTS

| | | | |
|---|---|---|---|
| 5,027,137 A | 6/1991 | Andoh et al. | |
| 5,940,633 A | 8/1999 | Yamamoto et al. | |
| 6,163,333 A * | 12/2000 | Kamioka | 347/241 |
| 7,936,494 B2 * | 5/2011 | Itabashi | 359/205.1 |
| 2002/0014532 A1 | 2/2002 | Yomogida et al. | |
| 2004/0179087 A1 | 9/2004 | Yoshizawa et al. | |
| 2005/0062836 A1 * | 3/2005 | Nakajima | 347/225 |
| 2009/0324292 A1 | 12/2009 | Oda | |
| 2011/0050837 A1 | 3/2011 | Sakurai | |

FOREIGN PATENT DOCUMENTS

| | | |
|---|---|---|
| JP | 61-087172 | 5/1986 |
| JP | 62-286855 | 12/1987 |
| JP | 02-150369 | 6/1990 |

(Continued)

*Primary Examiner* — Hai C Pham
(74) *Attorney, Agent, or Firm* — Renner, Otto, Boisselle & Sklar, LLP

(57) ABSTRACT

A light scanning includes an adjusting unit that displaces the optical member to adjust the optical axis of the laser beam. The adjusting unit includes a shaft portion, a shaft supporting portion, a turning portion, a driving portion, and a turning damping unit. The shaft portion is configured to bidirectionally move in a first direction and in a second direction while turning. The first direction is a direction where the shaft portion approaches the optical member. The second direction is a direction where the shaft portion moves away from the optical member. The shaft supporting portion supports the shaft portion, and moves the shaft portion in accordance with turning of the shaft portion. The turning portion turns the shaft portion. The driving portion turns the turning portion. The turning damping unit damps a turning force applied to the shaft portion by an external force.

8 Claims, 20 Drawing Sheets

(56) References Cited

FOREIGN PATENT DOCUMENTS

| | | |
|---|---|---|
| JP | 08-171148 | 7/1996 |
| JP | 09-309225 A | 12/1997 |
| JP | 10-010450 A | 1/1998 |
| JP | 10-311939 | 11/1998 |
| JP | 2001-142021 | 5/2001 |
| JP | 2001-350109 | 12/2001 |
| JP | 2003114394 A * | 4/2003 ............ G02B 26/10 |
| JP | 2003-270895 | 9/2003 |
| JP | 2004-264396 | 9/2004 |
| JP | 2005-088445 | 4/2005 |
| JP | 2008-139352 | 6/2008 |
| JP | 2010-8761 | 1/2010 |
| JP | 2010-204610 | 9/2010 |
| JP | 2011-053467 | 3/2011 |
| JP | 2011-133834 | 7/2011 |

* cited by examiner

LIGHT SCANNING DEVICE AND IMAGE FORMING APPARATUS

CROSS REFERENCE TO RELATED APPLICATIONS

This application is based on and claims priority under 35 U.S.C. §119 (a) to Japanese Patent Application 2011-264807, filed on Dec. 2, 2011 and Japanese Patent Application 2011-275782, filed on Dec. 16, 2011, the entire contents of which are incorporated herein by reference.

FIELD

The present invention relates to a light scanning device and an image forming apparatus with the light scanning device.

DESCRIPTION OF THE RELATED ART

An image processing apparatus, which is an electronic device, includes an image forming apparatus (such as a multifunction printer (MFP), a printer, and a facsimile) that forms an image on a recording paper. The image forming apparatus has a plurality of basic operation modes such as a copy mode, a facsimile mode, a printer mode, and a scanner mode.

This image forming apparatus acquires a desired image based on image information as follows. The image forming apparatus charges a photoreceptor with an electrostatic charging device and then uses a light scanning device to scan a photoreceptor drum with a laser beam corresponding to the image information so as to form an electrostatic latent image on a surface of the photoreceptor drum. Here, the light scanning device includes various lenses and various mirrors in a housing of the light scanning device. The lenses employ, for example, an image forming lens that converges a light from a light emitting source, which emits a laser beam, on the photoreceptor. The mirrors guide a laser beam to a predetermined path. The image forming lens employs an elongated lens that has a long axis in a main-scanning direction. The elongated lens is positioned such that the long axis (longitudinal) direction of the elongated lens is parallel to an axial direction of the photoreceptor drum in the housing (see, for example, Japanese Unexamined Patent Application Publication No. 2010-8761, which is hereinafter referred to as Patent Literature 1).

The image forming apparatus disclosed in Patent Literature 1 allows manually rotating the elongated lens of the light scanning device to correct inclination (misalignment) of an optical axis (a scanning line) when the light scanning device including the elongated lens is built into the image forming apparatus. This inclination of the optical axis may be misaligned due to an external force and a similar cause. Correction of the inclination of the optical axis is performed as follows. The light scanning device is taken out of the image forming apparatus. Subsequently, the elongated lens of the light scanning device that is manually taken out is rotationally moved. This consequently prevents image degradation such as inclination of an image and shifting of image due to inclination of the optical axis.

However, in the technique disclosed in Patent Literature 1, the correction of inclination of the optical axis after the light scanning device is built into the image forming apparatus is performed manually. Thus, the light scanning device needs to be taken out of the image forming apparatus. This takes a lot of labor to correct the inclination of the optical axis in the technique of Patent Literature 1.

In order to solve the aforementioned problem, it is an object of the present invention to provide a light scanning device and an image forming apparatus that do not take much labor to correct inclination of the optical axis.

SUMMARY OF THE INVENTION

In order to achieve the aforementioned object, a light scanning device according to the present invention irradiates a scan object with a laser beam via an optical member. The light scanning device includes an adjusting unit configured to displace the optical member to adjust an optical axis of the laser beam. The adjusting unit includes a shaft portion, a shaft supporting portion, a turning portion, a driving portion, and a turning damping unit. The shaft portion is configured to bidirectionally move in a first direction and in a second direction while turning. The first direction is a direction where the shaft portion approaches the optical member. The second direction is a direction where the shaft portion moves away from the optical member. The shaft supporting portion is configured to support the shaft portion, and move the shaft portion in accordance with turning of the shaft portion. The turning portion is configured to turn the shaft portion. The driving portion is configured to turn the turning portion. The turning damping unit is configured to damp a turning force. The turning force is applied to the shaft portion by an external force. The light scanning device is configured to displace the optical member in accordance with movement of the shaft portion in the first direction or the second direction.

With the present invention, the adjusting unit includes the shaft portion, the shaft supporting portion, the turning portion, the driving portion, and the turning damping unit. The present invention displaces the optical member in accordance with movement of the shaft portion in the first direction or the second direction. This does not take much labor to correct inclination of the optical axis.

Another known technique employs a motor as a driving source to rotate a cam using a spur gear and a worm gear of the motor, thus adjusting inclination of a lens (see, for example, Japanese Unexamined Patent Application Publication No. 2008-139352, which is hereinafter referred to as Patent Literature 2). With the technique of Patent Literature 2, the light scanning device is not necessary to be taken out of the image forming apparatus even in the event that a correction of inclination of the optical axis is performed.

The image forming apparatus generates vibration due to its operations. Not only the image forming apparatus of Patent Literature 1 but also the image forming apparatus of Patent Literature 2 is no exception. In the case of the image forming apparatus of Patent Literature 2, this vibration of the image forming apparatus is transmitted to the light scanning device. The transmission of vibration to the light scanning device makes the cam to rotate. Especially, the light scanning device as disclosed in Patent Literature 2 allows the cam to easily rotate, thus easily causing unnecessary rotation of the cam.

As described above, in the image forming apparatus of Patent Literature 2, a force is applied to the cam from outside. This easily causes an unnecessary rotational force to the cam, thus consequently inclining the optical axis.

Accordingly, in the known technique, the unnecessary rotation of the cam inclines the optical axis, thus consequently causing image degradation such as inclination of an image itself and image shifting.

In contrast, the present invention allows correcting inclination of the optical axis of the laser beam, and further prevents inclination of the optical axis of the laser beam from being displaced even if an external force such as vibration occurs during an operation of this device.

Specifically, with the present invention, the adjusting unit includes the shaft portion, the shaft supporting portion, the turning portion, the driving portion, and the turning damping unit. The present invention displaces the optical member in accordance with movement of the shaft portion in the first direction or the second direction. This configuration allows correcting inclination of the optical axis of the laser beam, and further prevents inclination of the optical axis of the laser beam from being displaced even if an external force such as vibration occurs during an operation of this device.

The aforementioned configuration may employ the following configuration. The shaft portion includes a screw portion with a screw groove. The shaft supporting portion includes a screw portion that fits the screw portion of the shaft portion. The screw portion of the shaft portion and the screw portion of the shaft supporting portion constitute the turning damping unit.

In this case, the shaft portion includes the screw portion. The shaft supporting portion also includes the screw portion. The screw portion of the shaft portion and the screw portion of the shaft supporting portion constitute the turning damping unit. Fitting of the screw portion of the shaft portion and the screw portion of the shaft supporting portion damps a turning force applied to the shaft portion by an external force. Also, the driving portion turns the shaft portion via the turning portion, thus displacing the optical member. That is, this prevents unnecessary turning of the shaft portion, and allows necessary turning of the shaft portion only. As a result, this allows adjustment of a displacement amount of the optical member corresponding only to a necessary turning amount of the shaft portion.

In the aforementioned configuration, the turning portion may include a first turning portion and a second turning portion. The first turning portion configured to have a turning axis that is the shaft portion, and to engage the shaft portion to turn the shaft portion. The second turning portion configured to have a turning axis intersecting with the turning axis of the first turning portion, and to turn the first turning portion. The driving portion turns the second turning portion. The first turning portion and the second turning portion constitute the turning damping unit.

In this case, a rotation shaft (the shaft portion) of the first turning portion has an axial direction orthogonal to an axial direction of a turning axis of the second turning portion. An external force applied to the first turning portion (specifically, the shaft portion) easily transmits in the axial direction of the shaft portion while the external force has difficulty in transmitting in another direction (preferably, a direction perpendicular to the axial direction of the shaft portion). Accordingly, this damps transmission of the external force, which is applied to the first turning portion, to the second turning portion. As a result, this reduces (prevents) an external force from being applied to the driving portion from the first turning portion via the second turning portion. The driving of the driving portion turns the second turning portion, and the turning of the second turning portion turns the first turning portion. Thus, the driving portion is not directly coupled to the shaft portion. This prevents the external force, which is applied to the first turning portion, from transmitting to the driving portion. With the present invention, only when the optical axis is automatically adjusted, the driving portion is allowed to be driven. This increases time when the driving portion is not excited. This prevents heat generation of the driving portion due to excitation except when the optical axis of the optical member is automatically adjusted.

The aforementioned configuration may employ the following configuration. The driving portion includes a driving shaft. The turning portion includes a first turning portion and a coupling portion. The first turning portion engages the shaft portion to turn the shaft portion around a turning axis of the shaft portion. The coupling portion couples a turning shaft of the first turning portion to a driving shaft of the driving portion. The first turning portion and the coupling portion constitute the turning damping unit.

In this case, the turning portion includes the first turning portion and the coupling portion as the turning damping unit. Thus, the coupling portion couples the turning shaft of the first turning portion to the driving shaft of the driving portion so as to damp an external force applied to the first turning portion in the coupling portion. As a result, this damps (preferably, prevents) the external force applied to the driving portion. Specifically, this damps the external force, which is applied to the coupling portion from the first turning portion by an external force, thus preventing the external force applied to the driving portion from the coupling portion.

The aforementioned configuration may employ the following configuration. The optical member has one end portion and another end portion. The other end portion side is turnable around the one end portion side as an axis. The shaft portion is in contact with the other end portion side of the optical member. The optical member is displaced in accordance with movement of the shaft portion in the first direction or the second direction.

In this case, the optical member includes one end portion and another end portion. The other end portion side of the optical member is turnable around the one end portion side of the optical member as an axis. The shaft portion is in contact with the other end portion side of the optical member. The optical member is displaced in accordance with movement of the shaft portion in the first direction or the second direction. Accordingly, this allows the adjusting unit to turn only the other end portion side of the optical member, thus displacing the optical member. The movement of the shaft portion in contact with the other end portion side of the optical member simply allows adjustment of the optical axis. This facilitates adjustment of the optical axis. In another member other than the shaft portion, which is in contact with the other end portion side of the optical member, adjusting the optical axis directly or indirectly in contact with the optical member complicates adjustment setting of the optical axis, thus making adjustment of the optical axis difficult.

The aforementioned configuration may employ the following configuration. The adjusting unit includes a biasing portion that biases the optical member in a pre-set direction. Biasing of the biasing portion allows the optical member to counter oppose the shaft portion.

In this case, the biasing of the biasing portion allows the optical member to counter oppose the shaft portion. This prevents the optical member from being displaced in the case where inclination of the optical axis of the laser beam does not need to be corrected. Even in a state where a force of the optical member and a force of the shaft portion are not balanced due to an external force, fitting of the screw portion of the shaft portion and the screw portion of the shaft supporting portion allows releasing the external force from the fitting portion. This prevents the external force from transmitting to the turning portion.

In the aforementioned configuration, the biasing portion may push the other end portion side of the optical member.

In this case, the biasing portion pushes the other end portion side of the optical member. The biasing portion not only prevent the optical member from being displaced when inclination of the optical axis of the laser beam does not need to be corrected, but also allows disposing the optical member without securing the other end portion side of the optical member.

The aforementioned configuration may further include a restricting portion configured to restrict the optical member to be displaced in a direction other than a pre-set direction.

In this case, the restricting portion is disposed, which is preferred to displace the optical member only in a direction related to the optical axis adjustment. The configuration where the biasing portion includes the restricting portion displaces the optical member only in the direction related to the optical axis adjustment while preventing the external force from transmitting to the turning portion.

The aforementioned configuration may further include a support body where the optical member is mounted. The support body may have a cutout portion that fits the shaft portion. The shaft portion may have a depressed portion that turnably fits the cutout portion of the support body.

In this case, the depressed portion of the shaft portion fits the cutout portion of the support body. This makes the support body and the shaft portion an integrated member. This allows the support body, which fits the depressed portion of the shaft portion, to move in conjunction with turning of the shaft portion.

The aforementioned configuration may employ the following configuration. The configuration switches excitation of the driving portion. The driving portion may not be excited at least except when the optical member is displaced to adjust the optical axis of the laser beam.

In this case, only when the optical axis of the optical member is automatically adjusted, the driving portion may be excited. This prevents heat generation of the driving portion due to excitation except when the optical axis of the optical member is automatically adjusted.

In the aforementioned configuration, the driving portion may be disposed outside of a housing of the light scanning device.

In this case, this prevents heat, which is generated from the driving portion, from being filled inside the housing of the light scanning device.

In order to achieve the aforementioned object, an image forming apparatus according to the present invention includes the light scanning device according to the present invention.

With the present invention, the light scanning device according to the present invention is provided. This allows correcting the inclination of the optical axis of the laser beam. Additionally, the turning damping unit prevents the inclination of the optical axis of the laser beam from being displaced even if an external force such as vibration occurs during an operation of this device. This allows correcting the inclination of the optical axis of the laser beam without taking the light scanning device out of this image forming apparatus. This allows correcting the inclination of the optical axis of the laser beam even if an external force such as vibration occurs during an operation of this image forming apparatus.

In order to achieve the aforementioned object, a light scanning device according to the present invention irradiates a scan object with a laser beam via an optical member. The light scanning device includes an adjusting unit configured to displace the optical member to adjust an optical axis of the laser beam. The adjusting unit is configured to allow switching a manual optical axis adjustment and an automatic optical axis adjustment. The manual optical axis adjustment adjusts an optical axis with a manual operation. The automatic optical axis adjustment adjusts an optical axis with driving of the adjusting unit.

With the present invention, the adjusting unit allows switching the manual optical axis adjustment and the automatic optical axis adjustment. The adjusting unit displaces the lens to adjust the inclination of the optical axis of the laser beam emitted from the lens. This does not take much labor to correct inclination of the optical axis.

The other known technique employs a motor as a driving source to rotate a cam using a spur gear and a worm gear of the motor, thus adjusting inclination of a lens (see, for example, Japanese Unexamined Patent Application Publication No. 2008-139352, which is hereinafter referred to as Patent Literature 2). With the technique of Patent Literature 2, the light scanning device is not necessary to be taken out of the image forming apparatus even in the event that correction of inclination of the optical axis is performed. The technique of Patent Literature 2 allows adjustment of the optical axis without any external operation (automatically).

However, the technique of Patent Literature 2 does not allow an external operation (a manual operation) to correct inclination of the optical axis, unlike the technique of Patent Literature 1. Consequently, this does not provide a high degree of freedom for correction of inclination of the optical axis.

In contrast, with the present invention, correcting the inclination of the optical axis of the laser beam employs adjusting the optical axis with a manual operation (external operation) and adjusting the optical axis without any manual operation (without any external operation). As a result, this ensures a high degree of freedom in the correction of the optical axis.

Specifically, with the present invention, the adjusting unit allows switching the manual optical axis adjustment and the automatic optical axis adjustment. The adjusting unit displaces the lens to adjust the inclination of the optical axis of the laser beam that is emitted from the lens. Correcting the inclination of the optical axis of the laser beam employs adjusting the optical axis with a manual operation (external operation) and adjusting the optical axis without any manual operation (without any external operation). This ensures a light scanning device with a high degree of freedom in the optical axis adjustment.

In the aforementioned configuration, a common optical axis adjusting portion may be provided. The common optical axis adjusting portion is used in both optical axis adjustments of the manual optical axis adjustment and the automatic optical axis adjustment.

In this case, the common optical axis adjusting portion, which is used in both optical axis adjustments of the manual optical axis adjustment and the automatic optical axis adjustment, is provided. This eliminates the need for disposing an adjustment portion for the manual optical axis adjustment and an adjustment portion for the automatic optical axis adjustment separately. This ensures a downsized mechanism for the optical axis adjustment that is not complicated.

The aforementioned configuration may employ the following configuration. The adjusting unit includes a shaft portion, a shaft supporting portion, a turning portion, a driving portion, and a manual adjustment portion. The shaft portion is configured to bidirectionally move in a first direction and in a second direction while turning. The first direction is a direction where the shaft portion approaches the optical member. The second direction is a direction where the shaft portion moves away from the optical member. The shaft supporting portion is configured to support the shaft portion, and move the shaft portion in accordance with turning of the shaft portion. The turning portion is configured to turn the shaft portion. The driving portion is configured to turn the turning portion. The manual adjustment portion is configured to adjust an optical axis with a manual operation. The common optical axis adjusting portion is disposed in the turning portion. The driving portion turns the shaft portion via the common optical axis adjusting portion when performing the automatic optical axis adjustment. The manual adjustment portion turns the shaft portion via the common optical axis adjusting portion when performing the manual optical axis adjustment.

In this case, the driving portion turns the shaft portion via the common optical axis adjusting portion when performing the automatic optical axis adjustment. This allows the automatic optical axis adjustment without any manual operation. The manual adjustment portion turns the shaft portion via the common optical axis adjusting portion when performing the manual optical axis adjustment. This allows the manual optical axis adjustment with a manual operation.

The aforementioned configuration may employ the following configuration. The manual adjustment portion may include a manual shaft portion and a manual gear. The manual shaft portion allows turning by a manual operation. The manual gear synchronizes turning of the manual shaft portion. The manual shaft portion is inserted into a housing of the light scanning device from outside, a distal end of the manual shaft portion is disposed inside of the housing, and a base end of the manual shaft portion is disposed outside of the housing. The manual shaft portion is pushed from the base end toward the distal end so as to fit the manual gear to the turning portion.

In this case, the base end of the manual shaft portion is disposed outside of the housing of the light scanning device. Pressing the base end by a user (a manual operation) allows the manual optical axis adjustment. In the case of no manual operation where the user does not press the base end, the automatic optical axis adjustment is possible.

Additionally, with this configuration, the manual gear does not always fit the turning portion. The manual gear fits the turning portion as necessary. As a result, this drives the driving portion only with a torque necessary for turning of the shaft portion without considering whether or not the manual gear fits the turning portion when performing the automatic optical axis adjustment. Thus, this allows the automatic optical axis adjustment.

The aforementioned configuration may further include a manual biasing member disposed on the end of the manual adjustment portion outside of the housing of the light scanning device. The manual biasing member may bias the manual shaft portion in a direction from the distal end toward the base end.

In this case, the manual biasing member biases the manual shaft portion in the direction from the distal end toward the base end. This prevents the manual gear from fitting the turning portion when the manual optical axis adjustment is not necessary, and this allows the manual gear to fit the turning portion only when performing the manual optical axis adjustment.

The aforementioned configuration may employ the following configuration. The shaft portion includes a screw portion with a screw groove. The shaft supporting portion includes a screw portion that turnably fits the screw portion of the shaft portion.

In this case, the shaft portion includes the screw portion. The shaft supporting portion also includes the screw portion. The screw portion of the shaft portion and the screw portion of the shaft supporting portion constitute the turning damping unit. Fitting of the screw portion of the shaft portion and the screw portion of the shaft supporting portion damps a turning force applied to the shaft portion by an external force. Also, the driving portion turns the shaft portion via the turning portion, thus displacing the optical member. That is, this prevents unnecessary turning of the shaft portion, and allows necessary turning of the shaft portion only. As a result, this allows adjustment of a displacement amount of the optical member corresponding only to a necessary turning amount of the shaft portion.

The aforementioned configuration may employ the following configuration. The adjusting unit includes a biasing portion that biases the optical member in a pre-set direction. Biasing of the biasing portion allows the optical member to counter oppose the shaft portion.

In this case, the biasing of the biasing portion allows the lens to counter oppose the shaft portion. This prevents the lens from being displaced in the case where inclination of the optical axis of the laser beam does not need to be corrected.

The aforementioned configuration may employ the following configuration. The turning portion includes a first turning portion and a second turning portion. The first turning portion configured to have a turning axis that is the shaft portion, and to engage the shaft portion to turn the shaft portion. The second turning portion configured to have a turning axis intersecting with the turning axis of the first turning portion, and to turn the first turning portion. The driving portion turns the second turning portion.

In this case, a rotation shaft (the shaft portion) of the first turning portion has an axial direction orthogonal to an axial direction of a turning axis of the second turning portion. An external force applied to the first turning portion (specifically, the shaft portion) easily transmits in the axial direction of the shaft portion while the external force has difficulty in transmitting in another direction (preferably, a direction perpendicular to the axial direction of the shaft portion). Accordingly, this damps transmission of the external force, which is applied to the first turning portion, to the second turning portion. As a result, this reduces (prevents) an external force from being applied to the driving portion from the first turning portion via the second turning portion. The driving of the driving portion turns the second turning portion, and the turning of the second turning portion turns the first turning portion. Thus, the driving portion is not directly coupled to the shaft portion. This prevents the external force, which is applied to the first turning portion, from transmitting to the driving portion.

With this configuration, only when the optical axis is automatically adjusted, the driving portion is allowed to be driven. This increases time when the driving portion is not excited. This prevents heat generation of the driving portion due to excitation except when the optical axis of the optical member is automatically adjusted (for example, when the manual optical axis adjustment is performed or during waiting).

The aforementioned configuration may employ the following configuration. The configuration switches excitation of the driving portion. The driving portion is not excited at least except when the optical member is displaced to adjust the optical axis of the laser beam.

In this case, only when the optical axis of the optical member is automatically adjusted, the driving portion may be excited. This prevents heat generation of the driving portion due to excitation except when the optical axis of the optical member is automatically adjusted (for example, when the manual optical axis adjustment is performed or during waiting).

In the aforementioned configuration, the driving portion may be disposed outside of a housing of this light scanning device.

In this case, this prevents heat, which is generated from the driving portion, from being filled inside the housing of this light scanning device.

In order to achieve the aforementioned object, an image forming apparatus according to the present invention includes the light scanning device according to the present invention.

With the present invention, the light scanning device according to the present invention is provided. This allows switching the manual optical axis adjustment and the automatic optical axis adjustment. As a result, correcting the inclination of the optical axis of the laser beam employs adjusting the optical axis with a manual operation (external operation) and adjusting the optical axis without any manual operation (without any external operation). This ensures a light scanning device with a high degree of freedom in the optical axis adjustment. The present invention allows easily correcting the inclination of the optical axis (the manual optical axis adjustment and the automatic optical axis adjustment) without taking the light scanning device out of this image forming apparatus.

Figure 1:
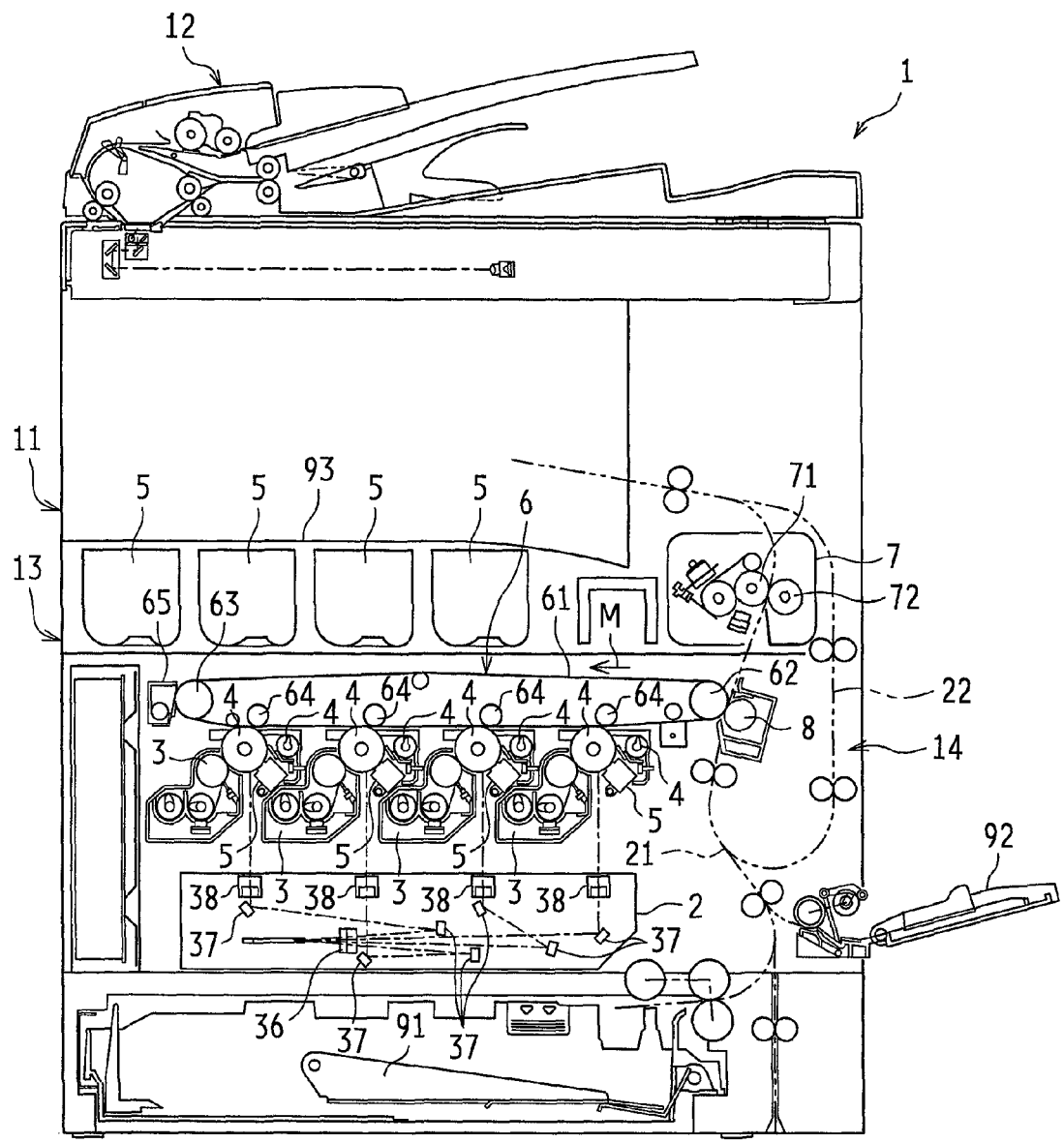
FIG. 1 is a schematic configuration diagram illustrating an overall configuration of an image forming apparatus according to Embodiments 1 and 2, and is a schematic cross-sectional shown from a front view.

REFERENCE SIGNS LIST 1 image forming apparatus
2 exposure unit
2$a$ housing of exposure unit
2$b$1 first protrusion of housing of exposure unit
2$c$1 second protrusion of housing of exposure unit
2$d$1 rib of housing of exposure unit
2$b$2 protrusion of housing of exposure unit
2$c$2 positioning protrusion of housing of exposure unit
2$d$2 through-hole of housing of exposure unit
3 developing unit
4 photoreceptor drum
5 toner cartridge unit
6 intermediate transfer belt unit
7 fixing unit
8 transfer roller
11 device main body of image forming apparatus
12 document scanning unit
13 image forming unit
14 paper conveyance system
21 paper conveyance passage
22 inverting conveyance passage
30 laser emitting portion
31 collimator lens
32 first reflective mirror
33 cylindrical lens
34 second reflective mirror
35 rotating polygon mirror
36 first fθ lens
37 return mirror
38 second fθ lens
38$a$ one end portion of second fθ lens
38$b$ the other end portion of second fθ lens
38$c$ shaft hole
40 adjusting unit
41 support body
42 plate spring
43 one end portion of support body
44 shaft hole
45 cutout portion
46 wall portion
471 hole 472 shaft hole
48 the other end portion of support body
50 displacement portion
511 biasing portion
51a kick spring
51b restricting portion
51c washer
51d screw
51e compression spring
51f pulling spring
512 kick spring
51a2 compression spring
51b2 pulling spring
52 adjustment portion
53 shaft portion
53a distal end of shaft portion
53b male thread portion
53c base end of shaft portion
53d depressed portion of shaft portion
53e center portion of shaft portion
54 shaft supporting portion
54a bottom surface portion
54b and 54c wall portion
54d inserting portion
54e female thread portion
55 first gear
55a through-hole
56 second gear
57 driving portion
57a driving shaft
58 manual adjustment portion
58a manual shaft portion
58b manual gear
58c distal end of manual shaft portion
58d center portion of manual shaft portion
58e base end of manual shaft portion
58f E-ring
58g compression spring
59 coupling portion
59a coupling hole
61 intermediate transfer belt
62 drive roller
63 driven roller
64 intermediate transfer roller
65 cleaning unit
71 heat roller
72 pressing roller
91 paper feed tray
92 manual paper feed tray
93 paper output tray

DETAILED DESCRIPTION

Embodiments according to the present invention will be described below by referring to the accompanying drawings.

Embodiment 1

Overall Configuration of an Image Forming Apparatus

FIG. 1 is a schematic front view illustrating an overall configuration of an image forming apparatus 1 according to Embodiment 1, and is a schematic cross-sectional shown from a front view.

The image forming apparatus 1 illustrated in FIG. 1 is a color image forming apparatus that forms an image with at least equal to or more than one color (a plurality of colors or a single color) on a sheet (hereinafter referred to as a recording paper) such as a recording paper corresponding to image data that forms an image.

The image forming apparatus 1 employs an electrophotographic system to form an image on a recording paper. The image forming apparatus 1 has operation modes of copy mode, facsimile mode, document filing mode (a mode to store a scanned image in the image forming apparatus 1), mail mode (a mode to send a scanned image in email attachment format), network printer mode, and similar mode. The operation modes of the image forming apparatus 1 should not be construed in a limiting sense. Any operation mode may be set.

The image forming apparatus 1 includes a device main body 11. The device main body 11 includes a document scanning unit 12, an image forming unit 13, and a paper conveyance system 14. The document scanning unit 12 is used for reading a sheet (hereinafter referred to as a document) such as a document. The image forming unit 13 forms an image of a document. The paper conveyance system 14 conveys a paper.

The image forming unit 13 includes an exposure unit 2, a plurality of developing units 3, a plurality of toner cartridge units 5, an intermediate transfer belt unit 6, a fixing unit 7, and a similar member. The image forming apparatus 1 handles image data that employs a plurality of colors (here, respective colors of black (K), cyan (C), magenta (M), and yellow (Y)). Accordingly, the plurality of respective developing units 3, toner cartridge units 5, and similar units are disposed (here, four units of black, cyan, magenta, and yellow are provided for each) to form a plurality of kinds (here, four kinds) of images corresponding to the respective colors. These units constitute an image station for each color (here, four stations).

The exposure unit 2 is a light scanning device that is constituted as a laser scanning unit (LSU) with a laser emitting portion and a reflective mirror. The exposure unit 2 irradiates a photoreceptor drum 4 (a scan object of the present invention) with a laser beam via various optical components (which will be described below) so as to scan the light.

The developing unit 3 uses four colors (Y, M, C, and K) of toners to visualize an electrostatic latent image formed on respective photoreceptor drums 4.

The intermediate transfer belt unit 6 includes an intermediate transfer belt 61 that operates as an intermediate transfer body, a drive roller 62, a driven roller 63, a plurality of intermediate transfer rollers 64, and a cleaning unit 65. A toner image is transferred from the photoreceptor drum 4 to the intermediate transfer belt 61 by the intermediate transfer roller 64 in contact with a back side of the intermediate transfer belt 61.

The intermediate transfer belt 61 is disposed in contact with the respective photoreceptor drums 4. The intermediate transfer belt 61 has a surface on which toner images of the respective colors, which are formed on the photoreceptor drums 4, are sequentially transferred to be overlaid. This forms a color toner image (multi-color toner image) on the surface of the intermediate transfer belt 61. The drive roller 62 stretches and rotatably drives the intermediate transfer belt 61 along with the driven roller 63 and the intermediate transfer roller 64 to move the intermediate transfer belt 61 around in a movement direction (a direction of an arrow M in FIG. 1). In association with this movement, the driven roller 63 and the intermediate transfer roller 64 are rotatably driven. Four intermediate transfer rollers 64 are disposed corresponding to the respective colors of Y, M, C, and K. The cleaning unit 65 is used for removing a toner image remaining on the intermediate transfer belt 61.

The toner cartridge unit 5 is a unit that stores toner, and supplies the toner from the toner cartridge unit 5 to a developer tank of the developing unit 3.

The fixing unit 7 fixes an unfixed toner image on the recording paper, and includes a heat roller 71 and a pressing roller 72, which operate as fixing rollers. The heat roller 71 rotatably drives, and this rotary drive drives the pressing roller 72. The heat roller 71 conveys the recording paper while sandwiching the recording paper with the pressing roller 72.

As described above, the toner images are visualized on the respective photoreceptor drums 4 corresponding to the respective colors, and laminated on the intermediate transfer belt 61. The toner images laminated on the intermediate transfer belt 61 are moved by rotation of the intermediate transfer belt 61. The toner images are then transferred on the recording paper with a transfer roller 8. The transfer roller 8 constitutes a secondary transfer mechanism that is disposed in a contacting position between the recording paper and the intermediate transfer belt 61.

The paper conveyance system 14 includes a paper feed tray 91, a manual paper feed tray 92, and a paper output tray 93.

The paper feed tray 91 is a tray that preliminarily stores a recording paper on which an image is formed (printed), and is disposed under the exposure unit 2 of the device main body 11.

A recording paper on which an image is formed (printed) is placed on the manual paper feed tray 92.

The paper output tray 93 is disposed above the image forming unit 13 in the device main body 11, and accumulates the recording papers on which images have been formed (printed) face down.

The device main body 11 includes a paper conveyance passage 21. The paper conveyance passage 21 feeds the recording paper, which is fed from the paper feed tray 91 and the manual paper feed tray 92, to the paper output tray 93 via the transfer roller 8 and the fixing unit 7. The paper conveyance passage 21 includes an inverting conveyance passage 22 for printing on both sides (on the front side and the back side) of the recording paper.

In the case where one-side printing on the recording paper is requested, the image forming apparatus 1 thus configured conveys the recording paper, which is supplied from the paper feed tray 91 and the manual paper feed tray 92, along the paper conveyance passage 21. The drive roller 62 and the transfer roller 8 transfer the toner image on the recording paper. Subsequently, the recording paper then passes the fixing unit 7. This melts and fixes the unfixed toner on the recording paper by heat. The recording paper on which the unfixed toner has been fixed in the fixing unit 7 is discharged onto the paper output tray 93.

In the case where both-side printing on the recording paper is requested, a conveying direction of the recording paper is reversed after the aforementioned one-side printing terminates and the recording paper passes the fixing unit 7, and the recording paper is introduced into the inverting conveyance passage 22 of the paper conveyance passage 21. Subsequently, the recording paper is conveyed to a transfer nip between the drive roller 62 and the transfer roller 8 again. A toner image is transferred onto the back side of the recording paper conveyed to the transfer nip. The unfixed toner is fixed in the fixing unit 7. Accordingly, the recording paper is discharged onto the paper output tray 93 after printing on the back side of the recording paper terminates.

Next, the exposure unit 2, which is the light scanning device of the image forming apparatus 1, will be described in detail by referring to the drawings.

(Exposure Unit 2 of the Image Forming Apparatus 1)

Figure 2:
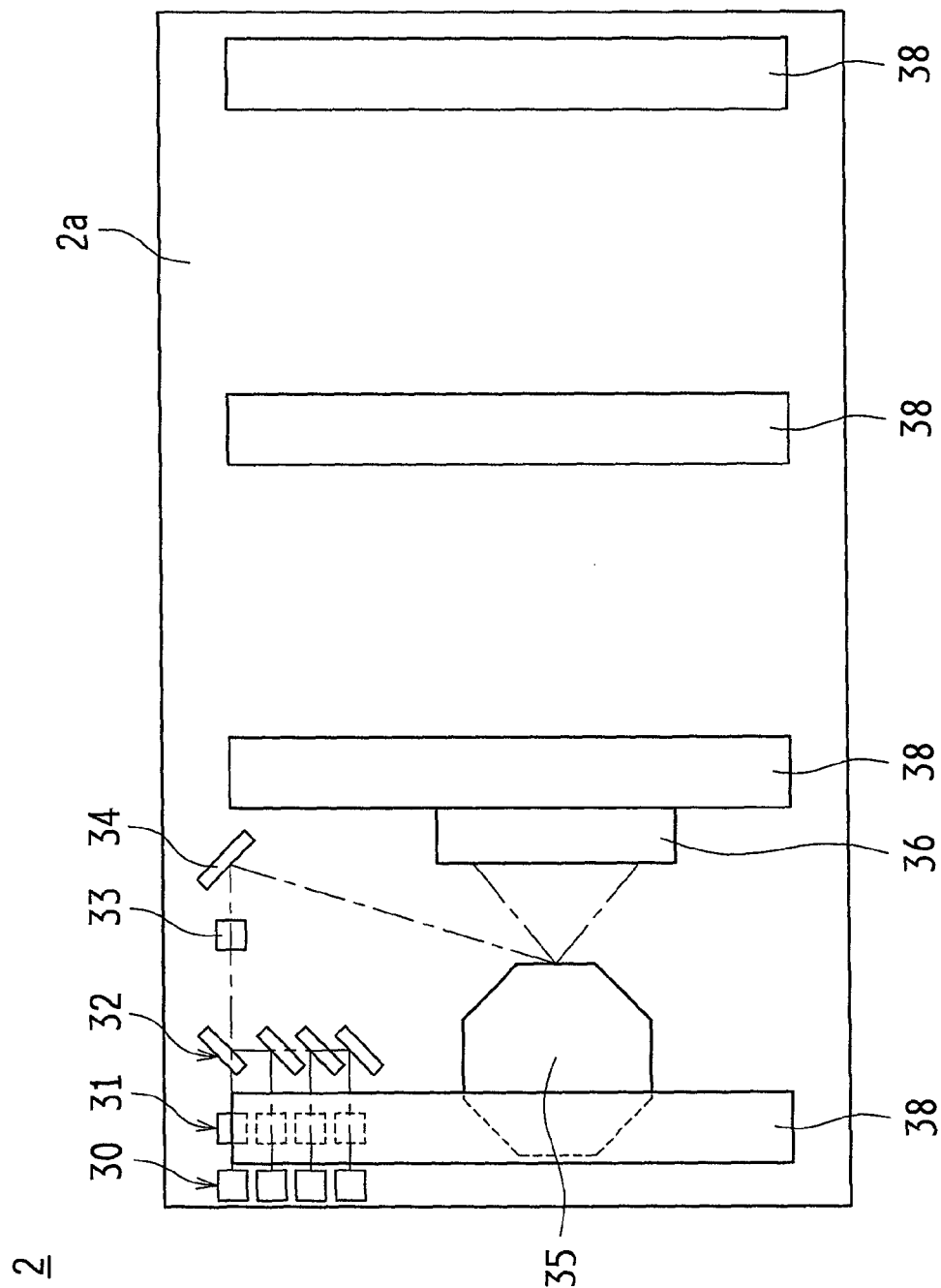
FIG. 2 is a diagram schematically illustrating a main part inside of a housing where an exposure unit in FIG. 1 is shown from a top surface.

As illustrated in FIGS. 1 and 2, the exposure unit 2 is the light scanning device that is constituted as a laser scanning unit (LSU). The LSU emits a laser beam from four laser emitting portions 30 corresponding to the respective colors to the photoreceptor drums 4 via the rotating polygon mirror 35 and a similar member. The exposure unit 2 exposes the respective charged photoreceptor drums 4 corresponding to input image data. This forms electrostatic latent images corresponding to the image data on surfaces of the respective photoreceptor drums 4.

The exposure unit 2 includes an optical path from the laser emitting portion 30 to the photoreceptor drum 4. Various optical components are disposed on the optical path. Specifically, from the laser emitting portion 30 side, four collimator lenses 31, four first reflective mirrors 32, a cylindrical lens 33, a second reflective mirror 34, a rotating polygon mirror 35, a first fθ lens 36, a return mirror 37, and a second fθ lens 38 (an optical member of the present invention) are disposed in this order.

The four laser emitting portions 30 are beam emitting means that emit laser beams, and correspond to the respective colors.

The four collimator lenses 31 correspond to the respective four laser emitting portions 30, and convert the laser beams emitted from the laser emitting portions 30 into collimated beams.

The four first reflective mirrors 32 correspond to the respective four collimator lenses 31, and reflects the laser beams, which are converted in the collimator lenses 31, to make the laser beams enter the cylindrical lens 33.

The cylindrical lenses 33 focus the four laser beams, which have entered from the four first reflective mirrors 32, on the photoreceptor drums 4 in a sub-scanning direction.

The second reflective mirror 34 reflects the four laser beams, which are emitted from the cylindrical lens 33, and make the four laser beams enter the rotating polygon mirror 35.

In the rotating polygon mirror 35, the laser beams are irradiated on a center region of a reflecting surface in a height direction. The rotating polygon mirror 35 guides the laser beams, which are reflected on the reflecting surface of the rotating polygon mirror 35, from the rotating polygon mirror 35 to the photoreceptor drums 4. Especially, in the sub-scanning direction of the laser beams, the laser beams, which have entered the cylindrical lens 33, are almost converged on the surface of the reflecting surface of the rotating polygon mirror 35. In the main-scanning direction, the laser beams, which have entered the cylindrical lens 33, enter the reflecting surface of the rotating polygon mirror 35. The laser beams, which are reflected on the reflecting surface of the rotating polygon mirror 35, are guided from the rotating polygon mirror 35 to the photoreceptor drums 4.

In the main-scanning direction, the first fθ lens 36 converges collimated lights of the laser beams, which are emitted from the rotating polygon mirror 35, such that the laser beams have a predetermined beam diameter on the surfaces of the photoreceptor drums 4. In the sub-scanning direction, the first fθ lens 36 converts diffusion lights of the laser beams, which are emitted from the rotating polygon mirror 35, into collimated lights. The first fθ lens 36 has a function that converts a laser beam, which is moved at a constant angular velocity in the main-scanning direction by a constant angular velocity motion of the rotating polygon mirror 35, such that the laser beam moves at a constant linear velocity on the scanning line on the photoreceptor drum 4.

The return mirror 37 reflects the laser beams, which have been separated by the rotating polygon mirror 35 and have passed the first fθ lens 36, so as to make the laser beam enter the second fθ lens 38.

The second fθ lens 38 has a lens surface (not shown) with a convex shape that projects to an emitting surface side, and is made of, for example, polycarbonate resin. The second fθ lens 38 is an elongated lens that is long in the main-scanning direction (see FIGS. 2 and 3). In the sub-scanning direction, the second fθ lens 38 converges the laser beams, which enter the second fθ lens 38 as the collimated light, such that the laser beams have a predetermined beam diameter on the photoreceptor drums 4. In the main-scanning direction, the second fθ lens 38 converges the laser beams, which have been converted into convergent lights in the first fθ lens 36, directly on the photoreceptor drums 4.

The exposure unit 2 includes an adjusting unit 40. The adjusting unit 40 adjusts optical axes of the laser beams that are irradiated on the photoreceptor drums 4 via the second fθ lens 38. Around one end portion 38a of the second fθ lens 38 as an axis, the adjusting unit 40 turnably moves the other end portion 38b side so as to adjust inclination of the optical axes of the laser beams emitted from the second fθ lens 38. Thus, the adjusting unit 40 automatically corrects inclination of the scanning lines on image planes (drum surfaces) of the photoreceptor drums 4

As illustrated in FIGS. 3 to 7, the adjusting unit 40 includes a support body 41, on which the second fθ lens 38 is mounted, and a displacement portion 50, which displaces the second fθ lens 38.

Figure 3:
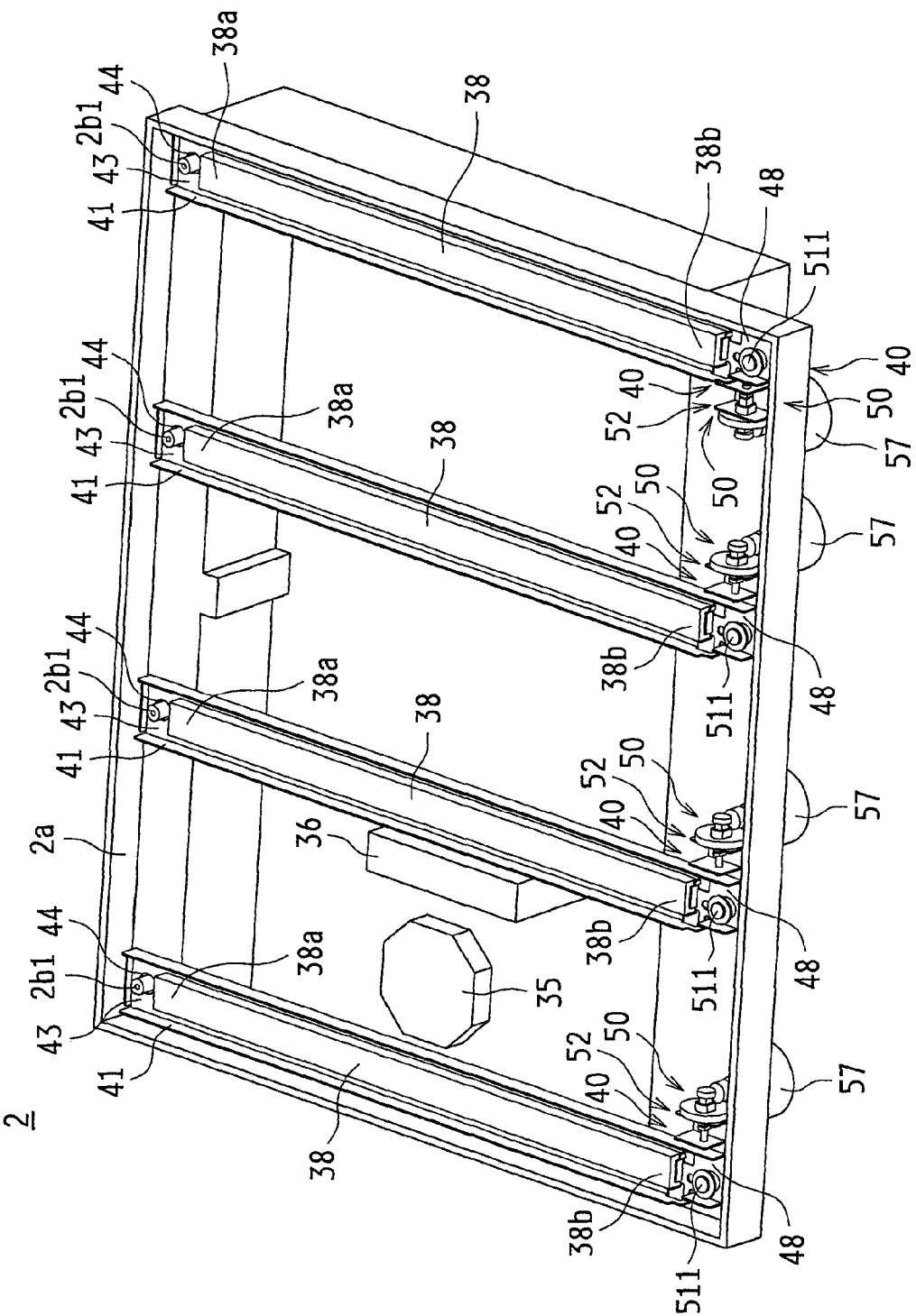
FIG. 3 is a schematic perspective view of the exposure unit illustrating positions of second fθ lenses.
Figure 4:
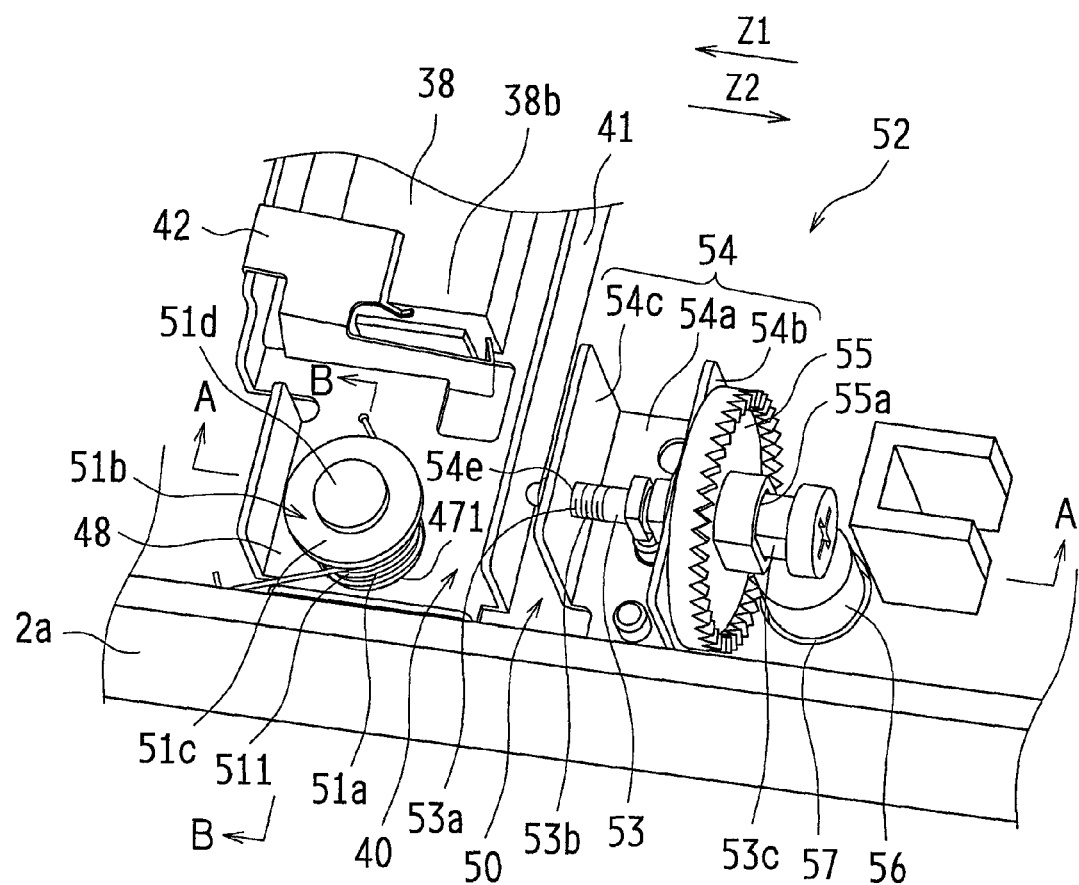
FIG. 4 is an enlarged perspective view of the main part in the exposure unit illustrating a relationship between the second fθ lens and an adjusting unit.
Figure 5:
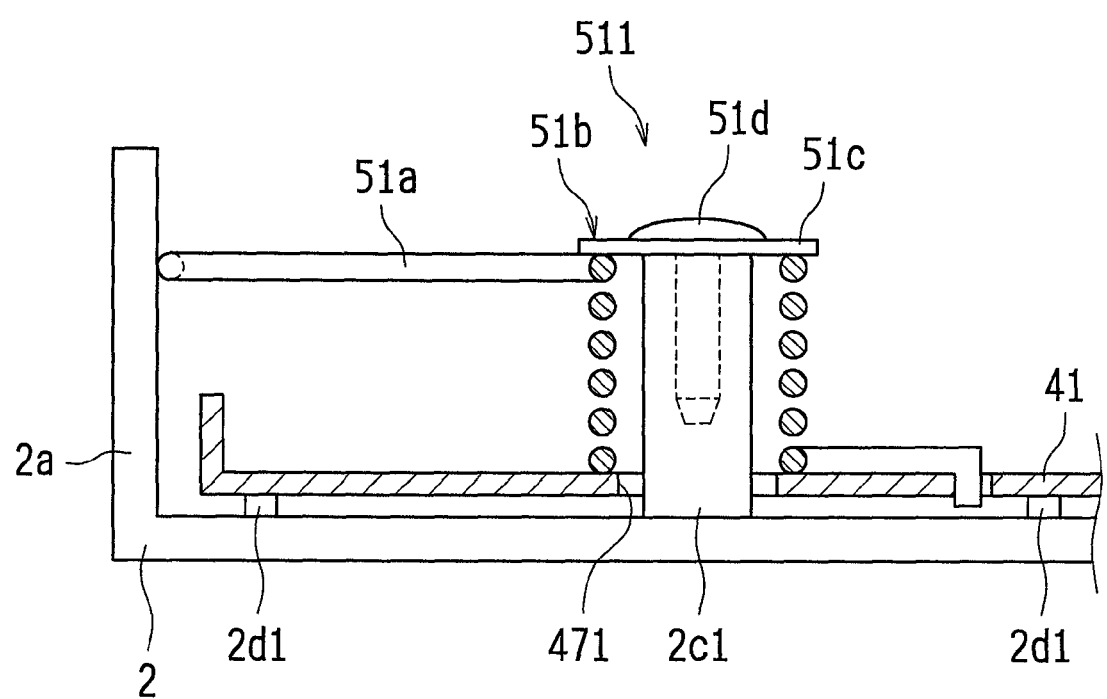
FIG. 5 is a cross-sectional view taken along the line B-B in FIG. 4.

The support body 41 is an elongated member that is formed by injection molding using, for example, a resin material. As illustrated in FIGS. 4 and 5, the second fθ lens 38 is secured with a plate spring 42. As illustrated in FIG. 3, the support body 41 has one end portion 43 that becomes a mounting portion of the one end portion 38a of the second fθ lens 38. On the one end portion 43, a shaft hole 44 is formed to pivotally support a housing 2a of the exposure unit 2. A first protrusion 2b1 of the housing 2a of the exposure unit 2 is inserted into the shaft hole 44. Thus, the one end portion 43 of the support body 41 is secured to the housing 2a of the exposure unit 2. The support body 41 includes the other end portion 48 where a hole 471 is formed to insert a second protrusion 2c1 to dispose the support body 41 onto the housing 2a of the exposure unit 2. The support body 41 is disposed on a plurality of ribs 2d1 that are formed in the housing 2a of the exposure unit 2. Accordingly, the support body 41 is in a floating state with respect to the housing 2a of the exposure unit 2 except portions in contact with the plurality of ribs 2d1. This configuration facilitates movement (displacement) of the support body 41.

The displacement portion 50 is a mechanism that allows the other end portion 48 of the support body 41 to turn around the one end portion 43 of the support body 41 as an axis. The displacement portion 50 includes a biasing portion 511 and an adjustment portion 52. The biasing portion 511 is disposed in the other end portion 48 of the support body 41 that becomes a mounting portion of the other end portion 38b of the second fθ lens 38. The biasing portion 511 biases the other end portion 48 of the support body 41 counterclockwise around the one end portion 43 of the support body 41 as an axis. The adjustment portion 52 is disposed outside the support body 41 (its other end portion 48), and adjusts an optical axis of a laser beam. In Embodiment 1, the one end portion 43 of the support body 41 corresponds to the one end portion 38a side of the second fθ lens 38 while the other end portion 48 of the support body 41 corresponds to the other end portion 38b side of the second fθ lens 38. While in Embodiment 1, the biasing portion 511 biases the other end portion 48 of the support body 41 counterclockwise around the one end portion 43 of the support body 41 as an axis, this should not be construed in a limiting sense. The biasing direction may be preliminarily set corresponding to an embodiment.

The biasing portion 511 includes a kick spring 51a and a restricting portion 51b. The kick spring 51a is used to bias the second fθ lens 38 in a pre-set direction (to bias the other end portion 48 of the support body 41 counterclockwise around the one end portion 43 of the support body 41 as an axis). The restricting portion 51b restricts movement of the support body 41 such that the support body 41 does not float above the housing 2a of the exposure unit 2 (movement of the support body 41 in a direction perpendicular to the turning direction). This biasing of the biasing portion 511 makes the support body 41 (the second fθ lens 38) and the shaft portion 53 to counter oppose each other. The restricting portion 51b includes the kick spring 51a (which is described below).

The kick spring 51a is threadably mounted on the second protrusion 2c1 that is formed on the housing 2a of the exposure unit 2. The kick spring 51a has one end that presses the housing of the exposure unit 2 and the other end that is inserted into a hole formed in the support body 41.

The restricting portion 51b includes the kick spring 51a, a washer 51c, and a screw 51d. The washer 51c and the screw 51d are used to compress the kick spring 51a. The washer 51c and the screw 51d are disposed on the top surface of the second protrusion 2c1. The restricting portion 51b presses the other end portion 38b side of the second fθ lens 38 via the kick spring 51a. This pressing by the restricting portion 51b compresses a kick spring 51a. In Embodiment 1, the other end portion 48 of the support body 41 corresponds to the other end portion 38b side of the second fθ lens 38.

As illustrated in FIGS. 3 to 7, the adjustment portion 52 includes a turnable shaft portion 53, a shaft supporting portion 54, a first gear 55 (a first turning portion of the present invention), a second gear 56 (a second turning portion of the present invention), and a driving portion 57. The shaft supporting portion 54 supports the shaft portion 53. The first gear 55 engages the shaft portion 53, and turns the shaft portion 53 around a turning axis of the shaft portion 53. The second gear 56 has a turning axis (a virtual axis) intersecting with the turning axis (the shaft portion 53) of the first gear 55. The second gear 56 fits the first gear 55, and turns the first gear 55. The driving portion 57 turnably drives the second gear 56. In Embodiment 1, the combination of the first gear 55 and the second gear 56 constitutes a turning portion. The turning portion is turned by the driving portion 57. The shaft portion 53 is turned by the turning portion.

The shaft portion 53 bidirectionally moves in the first direction Z1 (see FIGS. 4 to 7) where the shaft portion 53 approaches the second fθ lens 38, and in the second direction Z2 (see FIGS. 4 to 7) where the shaft portion 53 moves away from the second fθ lens 38 while turning. The biasing of the biasing portion 511 makes the shaft portion 53 to counter oppose the support body 41 (the second fθ lens 38 mounted on the support body 41) where a force (pressing) is applied to the other end portion 48 in a counterclockwise direction around the one end portion 43 as an axis. In the shaft portion 53, the force may be applied in an inverse direction of the biasing direction (a counterclockwise direction) of the kick spring 51a. The shaft portion 53 and the support body 41 (the second fθ lens 38) are disposed in a state where the forces are balanced. The shaft portion 53 has a distal end with a hemisphere shape and is disposed in contact with the support body 41. A distal end 53a of the shaft portion 53 includes a male thread portion 53b (a screw portion of a shaft portion of the present invention) where grooves of the male screw are formed. At least a base end 53c of the shaft portion 53 has a D shape in a cross-sectional view (hereinafter referred to as simply a D shape), and fits a through-hole 55a of the first gear 55 (which is described below). Accordingly, the base end 53c of the shaft portion 53 has the D shape, thus holding the engagement with the first gear 55 without being affected by turning of the shaft portion 53 and the first gear 55.

Figure 6:
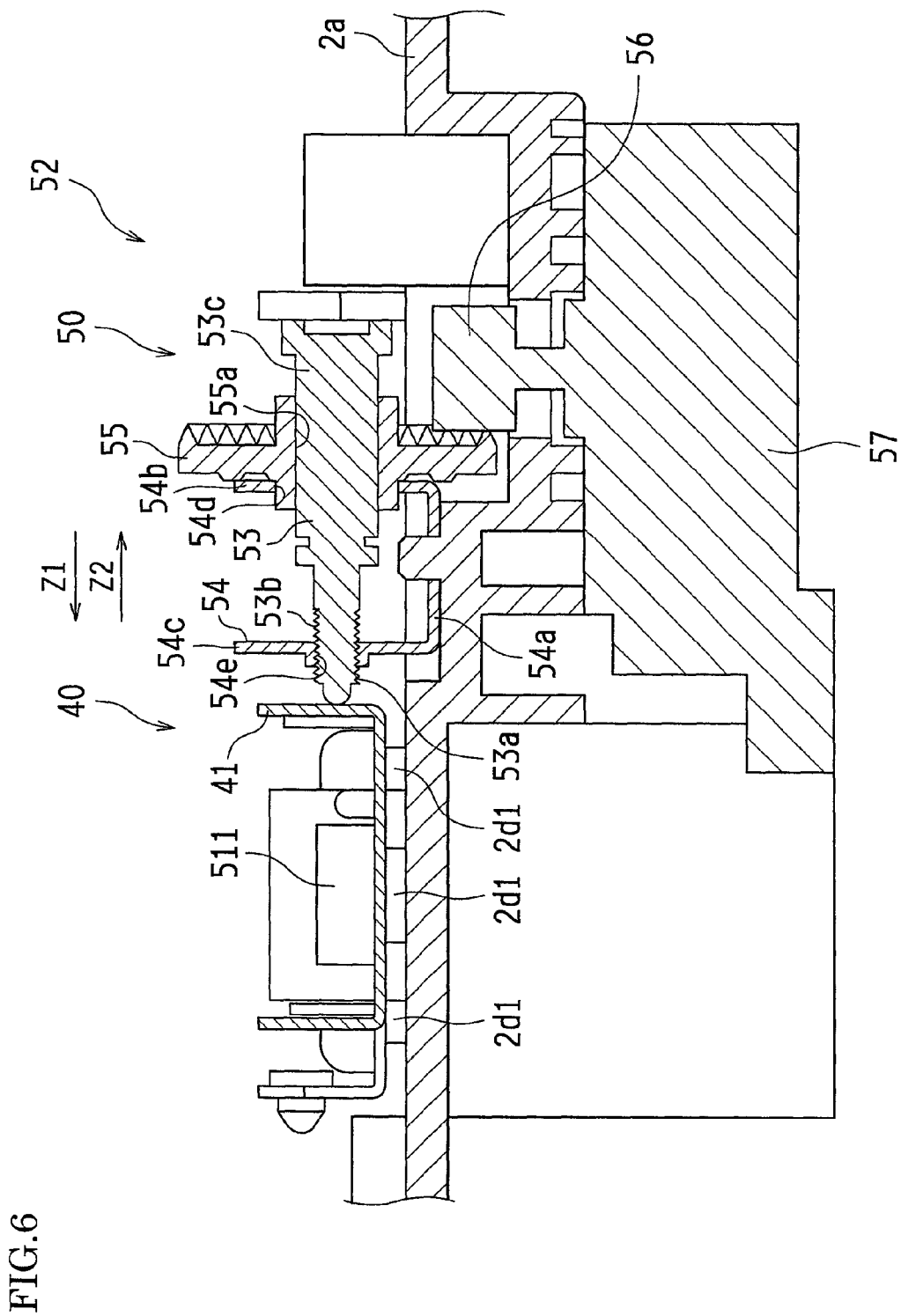
FIG. 6 is a cross-sectional view taken along the line A-A in FIG. 4.
Figure 7:
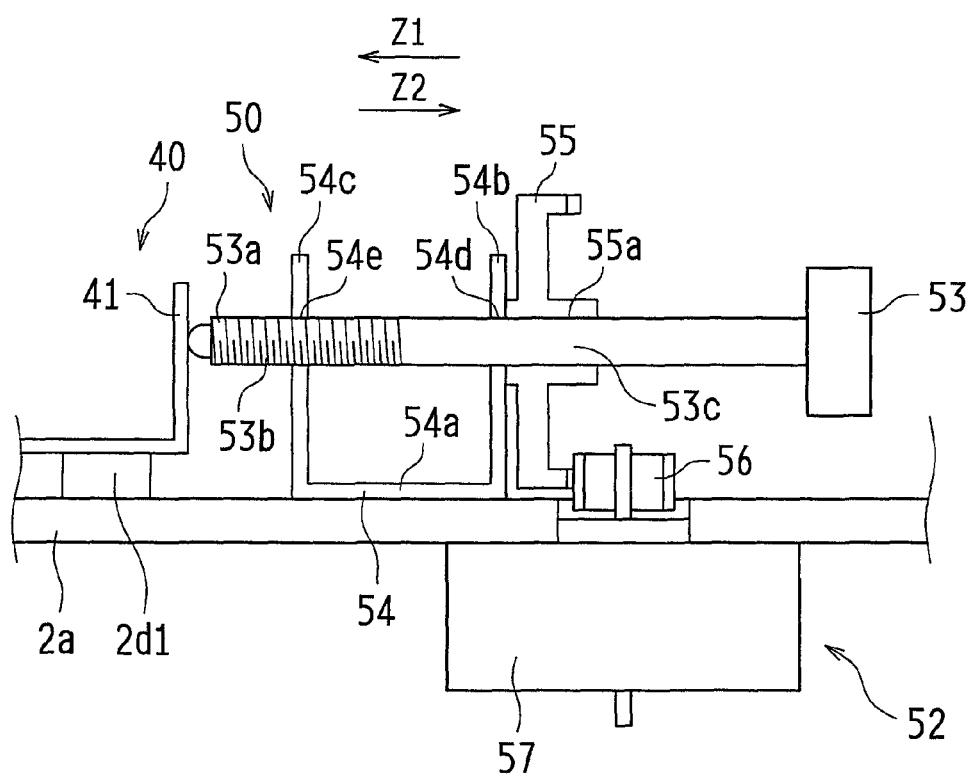
FIG. 7 is a schematic diagram illustrating a schematic configuration of the adjusting unit where the adjusting unit corresponding to FIG. 6 is shown from a side view.

The shaft supporting portion 54 supports the shaft portion 53, and moves the shaft portion 53 itself in accordance with turning of the shaft portion 53. As illustrated in FIGS. 4 to 6, the shaft supporting portion 54 includes a bottom surface portion 54a and two wall portions 54b and 54c. One wall portion 54b of the shaft supporting portion 54 includes an inserting portion 54d that allows the shaft portion 53 to be inserted while the other wall portion 54c includes a female thread portion 54e (a screw portion of a shaft supporting portion of the present invention) that allows the shaft portion 53 to be inserted and turnably fits the male thread portion 53b of the shaft portion 53. The female thread portion 54e of the shaft supporting portion 54 fits the male thread portion 53b of the shaft portion 53. This allows securing the shaft portion 53 to the shaft supporting portion 54.

As illustrated in FIGS. 4 to 6, the first gear 55 is a crown gear that engages the shaft portion 53 and turns the shaft portion 53 around a turning axis of the shaft portion 53. The shaft portion 53 is disposed to be inserted into the through-hole 55a of the center portion of the first gear 55. The shaft portion 53 turns in synchronization with turning of the first gear 55. The through-hole 55a of the first gear 55 has a hole shape that has a larger area in a cross-sectional view than that of at least the base end 53c of the shaft portion 53 in the D shape. Accordingly, the shaft portion 53 is disposed to be inserted into the through-hole 55a of the first gear 55 not by press fitting. There is a slight clearance between the shaft portion 53 and the through-hole 55a of the first gear 55. According to the engagement relationship between the shaft portion 53 and the first gear 55, the first gear 55 slightly moves in the event that the shaft portion 53 moves in the direction (the first direction Z1) where the shaft portion 53 approaches the support body 41 or in the direction (the second direction Z2) where the shaft portion 53 moves away from the support body 41. However, in the first gear 55 according to Embodiment 1, moving in the first direction Z1 is restricted by the one wall portion 54b while moving in the second direction Z2 is restricted by the second gear 56.

As illustrated in FIGS. 4 to 6, the second gear 56 is a spur gear that turns the first gear 55. The axial direction of the rotation shaft that functions as the axis (a virtual axis) of the turning is in an intersecting state where the axial direction is axially orthogonal to the rotation shaft (the shaft portion 53) of the first gear 55. The second gear 56 fits the first gear 55 and is turned by driving of the driving portion 57.

As illustrated in FIGS. 4 to 6, the driving portion 57 is a motor and is disposed outside of the housing 2a of the exposure unit 2. The driving portion 57 turns the second gear 56, and excitation of the driving portion 57 is switched on/off. Accordingly, the driving portion 57 is not constantly excited. The driving portion 57 is excited at least when an optical axis of the second fθ lens 38 is adjusted. That is, only when the optical axis of the second fθ lens 38 is automatically adjusted, the driving portion 57 may be excited. In a state where the second fθ lens 38 is displaced and the optical axis of the laser beam is not adjusted except when the optical axis of the second fθ lens 38 is automatically adjusted, the driving portion 57 is not excited. This prevents heat generation of the motor of the driving portion 57.

In the adjustment portion 52, driving of the driving portion 57 turns the second gear 56. Turning of the second gear 56 turns the first gear 55. Turning of the first gear 55 turns the shaft portion 53. Additionally, the male thread portion 53b of the shaft portion 53 turnably fits the female thread portion 54e of the shaft supporting portion 54. Thus, the shaft portion 53 moves in the direction (the first direction Z1) where the shaft portion 53 approaches the support body 41 or in the direction (the second direction Z2) where the shaft portion 53 moves away from the support body 41 based on the turning direction of the first gear 55. For more detail, the turning portion (the second gear 56 and the first gear 55) turns the shaft portion 53. This turning turns the shaft portion 53 while the male thread portion 53b of the shaft portion 53 is fitted along the screw groove of the female thread portion 54e in the shaft supporting portion 54. This consequently moves the shaft portion 53. In this turning, at least the base end 53c of the shaft portion 53 has a D shape, thus transmitting the turning of the turning portion to the shaft portion 53. This movement of the shaft portion 53 turns the other end portion 48 of the support body 41 in contact with the distal end of the shaft portion 53 around the one end portion 43 of the support body 41 as an axis, and displaces the second fθ lens 38 mounted on the support body 41. This displacement of the second fθ lens 38 automatically adjusts the optical axis of the laser beam irradiated on the photoreceptor drum 4 from the second fθ lens 38.

The aforementioned adjusting unit 40 allows the shaft portion 53 (especially, the male thread portion 53b) and the shaft supporting portion 54 (especially, the female thread portion 54e) to damp a turning force that is applied to the shaft portion 53 by an external force (such as vibration and impact) applied to the adjusting unit 40 from outside. For example, even when the external force is applied to the shaft portion 53, at least a part of the external force is converted into a friction force or a resisting force in a fitting portion where the male thread portion 53b fits the female thread portion 54e. As a result, this damps a moving force (specifically, the turning force applied to the shaft portion 53) that moves the shaft portion 53 by the external force. In the adjusting unit 40 according to Embodiment 1 that has these operations and effects, the shaft portion 53 (especially, the male thread portion 53b) fits the shaft supporting portion 54 (especially, the female thread portion 54e) to damp the turning force applied to the shaft portion 53 by the external force. The driving portion 57 turns the shaft portion 53 via the turning portion, thus displacing the second fθ lens 38. That is, this prevents unnecessary turning of the shaft portion 53 and allows necessary turning of the shaft portion 53 only. This consequently allows adjustment of a displacement amount of the second fθ lens 38 corresponding only to a necessary turning amount of the shaft portion 53.

The rotation shaft (the shaft portion 53) of the first gear 55 has the axial direction orthogonal to the axial direction of the turning axis (the virtual axis in Embodiment 1) of the second gear 56. The external force applied to the first gear 55 (especially, the shaft portion 53) easily transmits in the axial direction of the shaft portion 53 while the external force has difficulty in transmitting in another direction (especially, a direction perpendicular to the axial direction of the shaft portion 53). Accordingly, this damps transmission of the external force, which is applied to the first gear 55, to the second gear 56. As a result, this reduces (prevents) an external force from being applied to the driving portion 57 from the first gear 55 via the second gear 56. The driving of the driving portion 57 turns the second gear 56, and the turning of the second gear 56 turns the first gear 55. Thus, the driving portion 57 is not directly coupled to the shaft portion 53. This reduces a transmission of the external force, which is applied to the first gear 55, to the driving portion 57. In Embodiment 1, only when the optical axis is automatically adjusted, the driving portion 57 is allowed to be driven. This increases time when the driving portion 57 is not excited. This prevents heat generation of the driving portion 57 due to excitation except when the optical axis of the second fθ lens 38 is automatically adjusted.

With the above-described combination of the male thread portion 53b and the female thread portion 54e and the above-described combination of the first gear 55 and the second gear 56, a turning damping unit is constituted. The turning damping unit damps a turning force (an unnecessary moving force of the shaft portion 53) applied to the shaft portion 53 by the external force.

As described above, with the exposure unit 2 according to Embodiment 1, the adjusting unit 40 includes the shaft portion 53, the shaft supporting portion 54, the turning portion, the driving portion 57, and the turning damping unit. The second fθ lens 38 is displaced in accordance with movement of the shaft portion 53 in the first direction Z1 or the second direction Z2. This allows correcting the inclination of the optical axis of the laser beam. Additionally, the turning damping unit prevents the inclination of the optical axis of the laser beam from being displaced even if an external force such as vibration occurs during an operation of the exposure unit 2. If the optical axis of the second fθ lens 38 needs to be adjusted, this allows correcting the inclination of the optical axis without taking the exposure unit 2 out of the image forming apparatus 1.

With the image forming apparatus 1 according to Embodiment 1, the light scanning device of the exposure unit 2 is disposed. This allows correcting the inclination of the optical axis of the laser beam without taking the exposure unit 2 out of the image forming apparatus 1. Additionally, this prevents the inclination of the optical axis of the laser beam from being displaced even if an external force such as vibration occurs during an operation of the image forming apparatus 1.

The shaft portion 53 includes the male thread portion 53b. The shaft supporting portion 54 includes the female thread portion 54e. The male thread portion 53b of the shaft portion 53 and the female thread portion 54e of the shaft supporting portion 54 constitute the turning damping unit. Thus, fitting of the male thread portion 53b of the shaft portion 53 and the female thread portion 54e of the shaft supporting portion 54 damps the turning force (specifically, the turning force by turning in accordance with moving of the shaft portion 53) applied to the shaft portion 53 by the external force. Also, the driving portion 57 turns the shaft portion 53 via the turning portion, thus displacing the second fθ lens 38. That is, this prevents unnecessary turning of the shaft portion 53 and allows necessary turning of the shaft portion 53 only. This consequently allows adjustment of a displacement amount of the second fθ lens 38 corresponding only to a necessary turning amount of the shaft portion 53.

The other end portion 38b side of the second fθ lens 38 is turnable around the one end portion 38a side of the second fθ lens 38 as an axis. The shaft portion 53 is in contact with the other end portion 38b side of the second fθ lens 38. The second fθ lens 38 is displaced in accordance with movement in the first direction Z1 or the second direction Z2 of the shaft portion 53. Accordingly, the adjusting unit 40 turns only the other end portion 38b side of the second fθ lens 38, so as to displace the second fθ lens 38. The movement of the shaft portion 53 in contact with the other end portion 38b side of the second fθ lens 38 simply allows adjustment of the optical axis. This facilitates adjustment of the optical axis. In another member other than the shaft portion 53, which is in contact with the other end portion 38b side of the second fθ lens 38, adjusting the optical axis directly or indirectly in contact with the second fθ lens 38 complicates adjustment setting of the optical axis, thus making adjustment of the optical axis difficult.

The biasing of the biasing portion 511 allows the second fθ lens 38 and the shaft portion 53 to counter oppose each other. This prevents the second fθ lens 38 from being displaced in the case where the inclination of the optical axis of the laser beam does not need to be corrected. Even in a state where a force of the second fθ lens 38 and a force of the shaft portion 53 are not balanced due to an external force, the turning damping unit allows damping the external force. This prevents the external force from transmitting to the driving portion 57.

The biasing portion 511 presses the other end portion 38b side of the second fθ lens 38. The biasing portion 511 not only prevent the second fθ lens 38 from being displaced when the inclination of the optical axis of the laser beam does not need to be corrected, but also allows disposing the second fθ lens 38 without securing the other end portion 38b side of the second fθ lens 38.

Since the restricting portion 51b is disposed, it is suitable to displace the second fθ lens 38 only in a direction related to the optical axis adjustment. Especially, in Embodiment 1, the biasing portion 511 includes the restricting portion 51b. This displaces the second fθ lens 38 only in the direction related to the optical axis adjustment while preventing the external force from transmitting to the turning portion.

The driving of the driving portion 57 turns the second gear 56, and the turning of the second gear 56 turns the first gear 55. Therefore, the driving portion 57 is not directly coupled to the shaft portion 53. This prevents the external force, which is applied to the shaft portion 53, from transmitting to the driving portion 57. This consequently increases time when the driving portion 57 is not excited. This prevents heat generation of the driving portion 57 due to excitation except when the optical axis of the second fθ lens 38 is automatically adjusted.

The driving portion 57 is disposed outside the housing 2a of the exposure unit 2. This suppresses heat, which is generated from the driving portion 57, from being filled inside the housing 2a of the exposure unit 2.

Embodiment 1 employs the second fθ lens 38 as the optical member. This should not be construed in a limiting sense. Any other configuration is possible insofar as the optical member is interposed to irradiate the scan object (the photoreceptor drum 4) with the laser beam.

In Embodiment 1, the shaft portion 53 includes the male thread portion 53b where the grooves of the male screw are formed. The shaft supporting portion 54 includes the female thread portion 54e that fits the male thread portion 53b of the shaft portion 53. These configurations of the screw portions are not limited to this. The following configuration is also possible. The shaft portion 53 includes the female thread portion 54e where the grooves of the female screw are disposed. The shaft supporting portion 54 includes the male thread portion 53b that fits the female thread portion 54e of the shaft portion 53. That is, any other configuration is possible insofar as the shaft portion 53 includes the screw portion where the grooves of the screw are formed while the shaft supporting portion 54 includes the screw portion that turnably fits the screw portion of the shaft portion 53.

In Embodiment 1, the axial direction of the first gear 55 is orthogonal to the axial direction of the second gear 56, which is a preferred configuration. For example, the axial direction of the first gear 55 and the axial direction of the second gear 56 may form an angle of 90±10 degrees (in an approximately orthogonal state).

Figure 8:
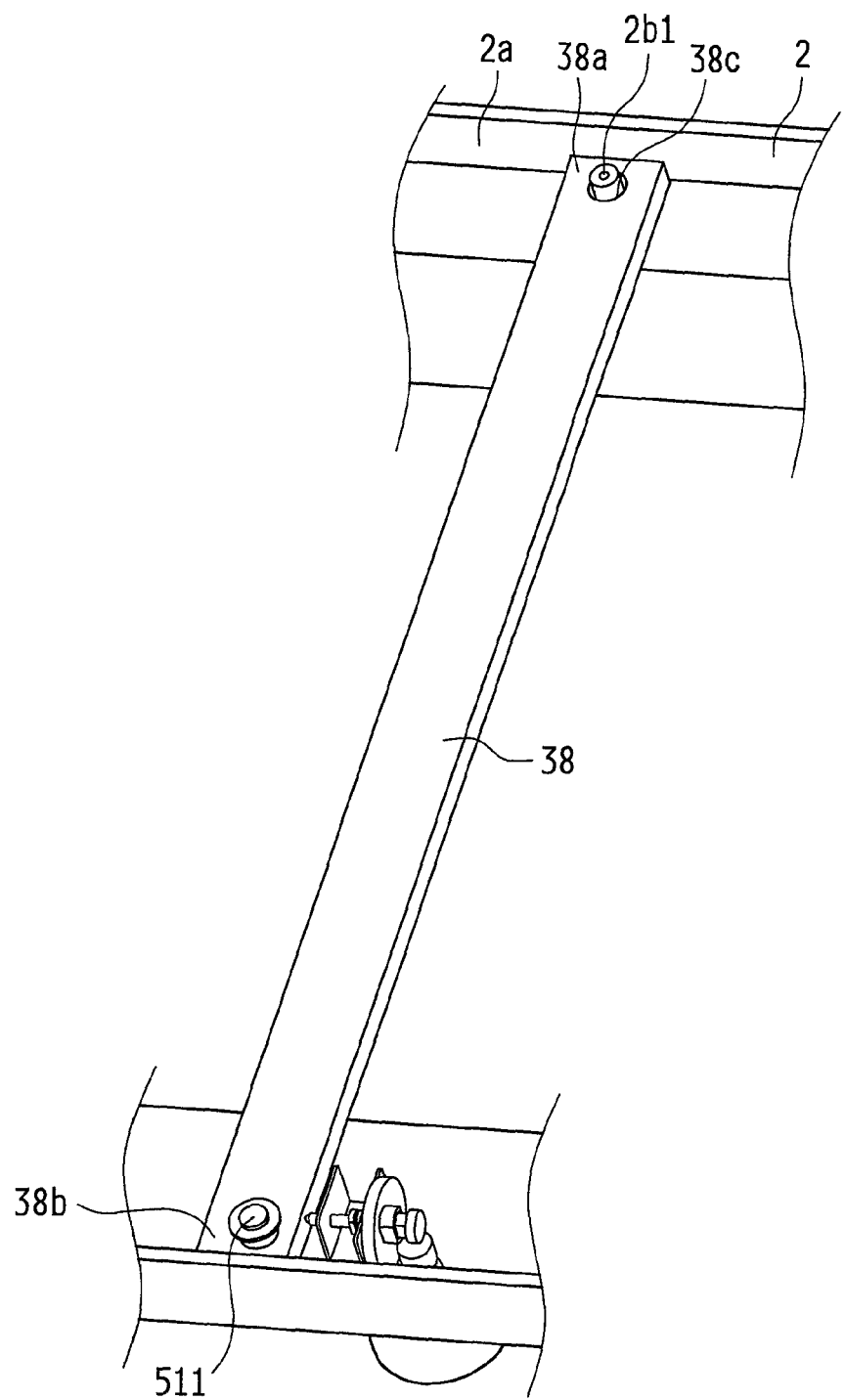
FIG. 8 is an enlarged perspective view of a main part of an exposure unit illustrating a relationship between a second fθ lens and an adjusting unit according to another embodiment.

While in Embodiment 1, the exposure unit 2 includes the second fθ lens 38 mounted on the support body 41, this should not be construed in a limiting sense. As illustrated in FIG. 8, the exposure unit 2 may include the second fθ lens 38 alone without the support body 41.

The second fθ lens 38 illustrated in FIG. 8 includes the one end portion 38a where a shaft hole 38c is formed corresponding to the shaft hole 44 of the support body 41. The first protrusion 2b1 of the housing 2a of the exposure unit 2 is inserted into the shaft hole 38c. The one end portion 38a of the second fθ lens 38 is secured to the housing 2a of the exposure unit 2. The biasing portion 511 is disposed on the other end portion 38b of the second fθ lens 38. In the embodiment in FIG. 8, the one end portion 38a of the second fθ lens 38 corresponds to the one end portion 38a side of the second fθ lens 38 while the other end portion 38b of the second fθ lens 38 corresponds to the other end portion 38b side of the second fθ lens 38.

Figure 9:
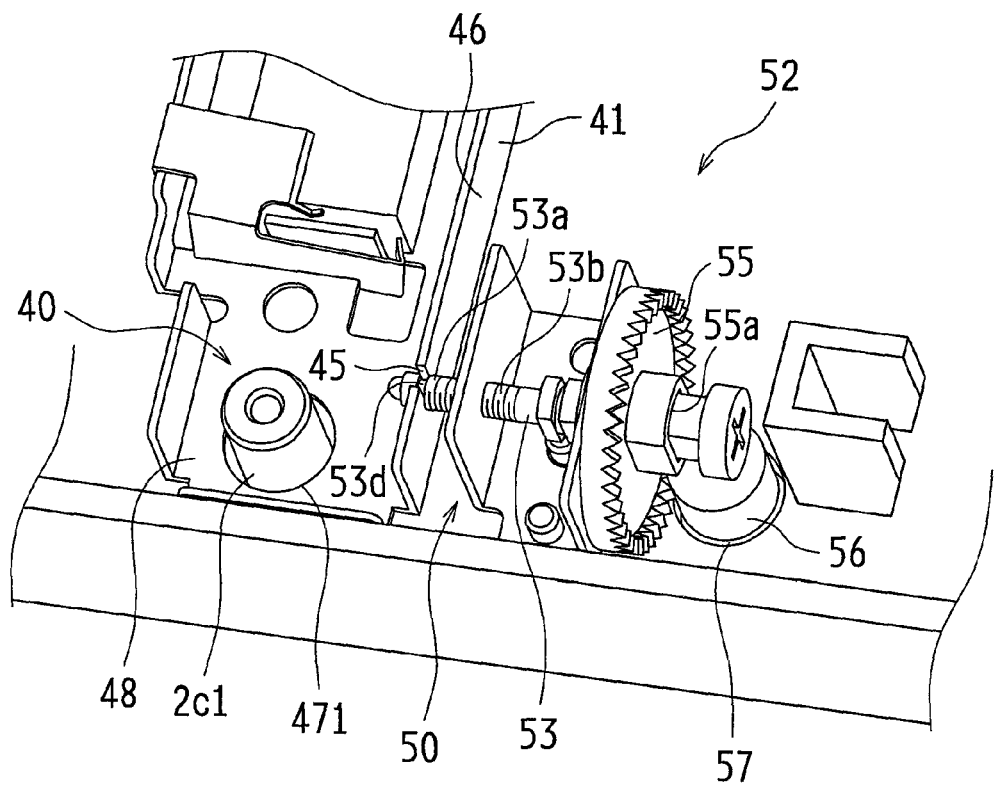
FIG. 9 is an enlarged perspective view of a main part of an exposure unit illustrating a relationship between a second fθ lens and an adjusting unit according to another embodiment.
Figure 10:
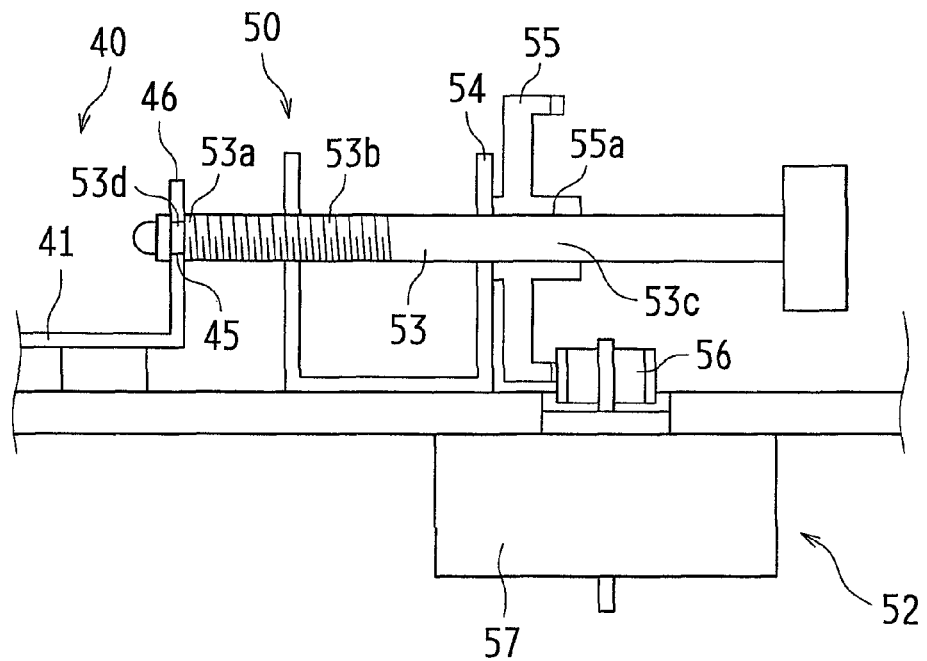
FIG. 10 is a schematic diagram illustrating a schematic configuration of the adjusting unit where the adjusting unit according to the other embodiment in FIG. 9 is shown from a side view.

In Embodiment 1, the adjusting unit 40 includes the support body 41 and the displacement portion 50. The second fθ lens 38 is mounted on the support body 41. The displacement portion 50 includes the biasing portion 511 and the adjustment portion 52. However, this should not be construed in a limiting sense. As illustrated in FIGS. 9 and 10, the adjusting unit 40 may be constituted of the support body 41 and the displacement portion 50 that includes the adjustment portion 52.

The adjusting unit 40 illustrated in FIGS. 9 and 10 differs in configuration of the displacement portion 50, compared with the aforementioned adjusting unit 40 in FIGS. 3 to 7.

The support body 41 illustrated in FIGS. 9 and 10 includes a cutout portion 45 that fits the shaft portion 53 (specifically, a depressed portion 53d of the shaft portion 53). This cutout portion 45 is formed in a wall portion 46 of the support body 41 adjacent to the adjustment portion 52. The support body 41 illustrated in FIGS. 9 and 10 does not include the biasing portion 511 unlike the aforementioned adjusting unit 40 illustrated in FIGS. 3 to 7. The other end portion 48 of the support body 41 includes a hole 471 into which the second protrusion 2c1 is inserted for disposing the support body 41 on the housing 2a of the exposure unit 2. The hole 471 has a hole diameter that is larger than a diameter of the second protrusion 2c1. A difference between the hole diameter of the hole 471 and the diameter of the second protrusion 2c1 is assumed to be the upper limit of the displacement amount of the second fθ lens 38. This allows displacing the second fθ lens 38 by an amount corresponding to a clearance between the hole 471 and the second protrusion 2c1.

The displacement portion 50 illustrated in FIGS. 9 and 10 is a mechanism that turns the other end portion 48 of the support body 41 around the one end portion 43 of the support body 41 as an axis. The displacement portion 50 is disposed outside of the other end portion 48 of the support body 41. The displacement portion 50 includes the adjustment portion 52 that adjusts the optical axis of the laser beam. The adjustment portion 52 has a different configuration of the shaft portion 53, and is otherwise similar to the adjustment portion 52 illustrated in FIGS. 3 to 7. Thus, the similar configuration will not be further elaborated here.

The shaft portion 53 of the adjustment portion 52 illustrated in FIGS. 9 and 10 has a distal end with a hemisphere shape in contact with the support body 41. The distal end 53a of the shaft portion 53 has the depressed portion 53d to fit the cutout portion 45 of the support body 41. The distal end 53a of the shaft portion 53 at the base end side of the shaft portion 53 with respect to the depressed portion 53d has the male thread portion 53b where the grooves of the male screw are formed.

The depressed portion 53d of the shaft portion 53 is formed in a wheel shape without any end portion in an outer periphery of the shaft portion 53. The depressed portion 53d of the shaft portion 53 fits the cutout portion 45 of the support body 41. This makes the shaft portion 53 and the support body 41 an integrated member. As a result, this allows the support body 41, which fits the depressed portion 53d of the shaft portion 53, to move in conjunction with turning of the shaft portion 53 by the adjustment portion 52 without the biasing portion 511 unlike the adjusting unit 40 illustrated in FIGS. 3 to 7. As a result, this allows the support body 41 to move so as to adjust the optical axis of the second fθ lens 38. The shaft portion 53 fits the depressed portion 53d. This also restricts movement of the support body 41 such that the support body 41 does not float. That is, this also functions as the restricting portion 51b that restricts movement (movement in a vertical direction with respect to the turning direction of the support body 41) of the support body 41. The combination of the depressed portion 53d and the shaft portion 53 may be also used as the restricting portion 51b. The combination of the depressed portion 53d and the shaft portion 53 allows restricting the support body 41 (the second fθ lens 38) to be displaced in a direction other than a preliminary set direction (the first direction Z1 and the second direction Z2).

While in Embodiment 1, the turning portion, which turns the shaft portion 53, is constituted of the first gear 55, the second gear 56, and the driving portion 57, this should not be construed in a limiting sense. For example, the configuration without the second gear 56 as illustrated in FIG. 11 is possible insofar as the configuration can convert the driving force from the driving portion 57 into a turning force as the turning portion.

Figure 11:
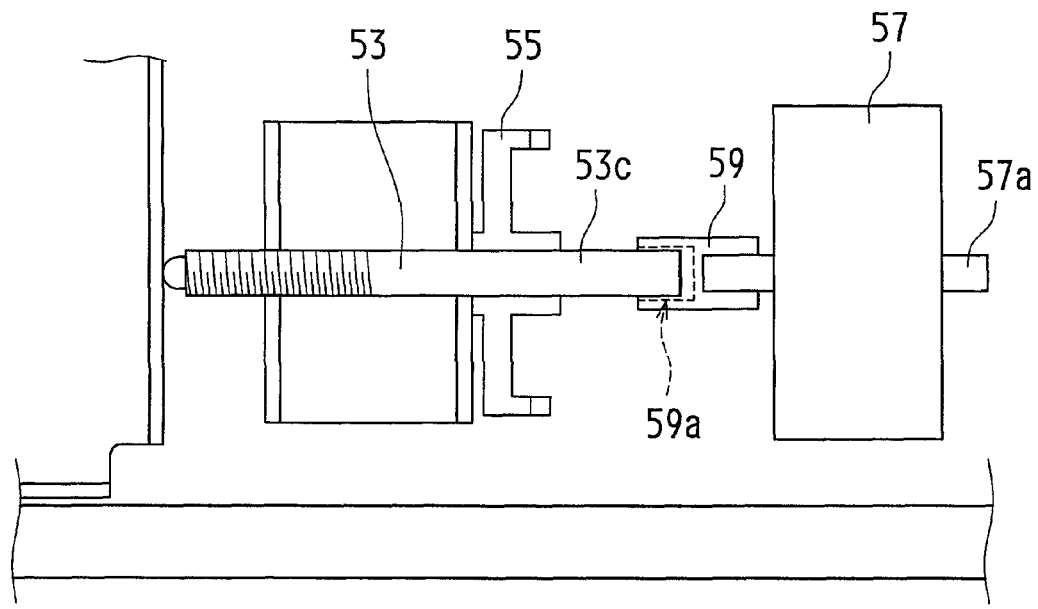
FIG. 11 is a schematic diagram illustrating a schematic configuration of an adjusting unit where of the adjusting unit according to another embodiment is shown from a plan view.

A turning portion illustrated in FIG. 11 includes the first gear 55, a driving portion 57, and a coupling portion 59. The coupling portion 59 couples the shaft portion 53 to a driving shaft 57a of the driving portion 57. In the shaft portion 53 illustrated in FIG. 11, the base end 53c is formed to axially extend from the shaft portion 53 according to the above-described Embodiment 1. The coupling portion 59 is a coupling while the driving portion 57 is a motor.

The coupling portion 59 includes a coupling hole 59a into which the base end 53c of the shaft portion 53 in a D shape is disposed to be inserted such that the shaft portion 53 is movably disposed. The coupling hole 59a has a hole shape with a larger area in a cross-sectional view than that of at least the base end 53c of the shaft portion 53 in a D shape. Accordingly, the shaft portion 53 is inserted into the coupling hole 59a not by press fitting. There is a slight clearance between the shaft portion 53 and the coupling hole 59a of the coupling portion 59.

In the turning portion thus configured illustrated in FIG. 11, the shaft portion 53 is coupled to the driving shaft 57a of the driving portion 57 by the coupling portion 59. The driving shaft 57a of the driving portion 57, the coupling portion 59, and the shaft portion 53 convert the driving force of the driving portion 57 into a rotational force of the shaft portion 53. Thus, the driving portion 57 turns the shaft portion 53. Accordingly, with the embodiment illustrated in FIG. 11, the coupling portion 59 only rotates and does not move. Only the shaft portion 53 moves in the first direction Z1 or the second direction Z2 while turning.

As described above, with the turning portion illustrated in FIG. 11, the first gear 55 and the coupling portion 59 are disposed as the turning damping unit. Accordingly, this allows the coupling portion 59, which couples the turning axis (the shaft portion 53) of the first gear 55 to the driving shaft 57a of the driving portion 57, to damp the external force applied to the first gear 55 in the coupling portion 59. As a result, this damps (preferably, prevents) the external force applied to the driving portion 57. Specifically, this damps the external force applied to the coupling portion 59 from the first gear 55 by an external force, thus preventing the external force applied to the driving portion 57 from the coupling portion 59. This prevents the external force applied to the first gear 55 from transmitting to the driving portion 57.

While Embodiment 1 employs the kick spring 51a as one configuration of the biasing portion 511, this should not be construed in a limiting sense. Any other configuration is possible insofar as the biasing portion 511 biases the other end portion 48 of the support body 41 counterclockwise around the one end portion 43 of the support body 41 as an axis. For example, springs illustrated in FIGS. 12 and 13 may be employed.

Figure 12:
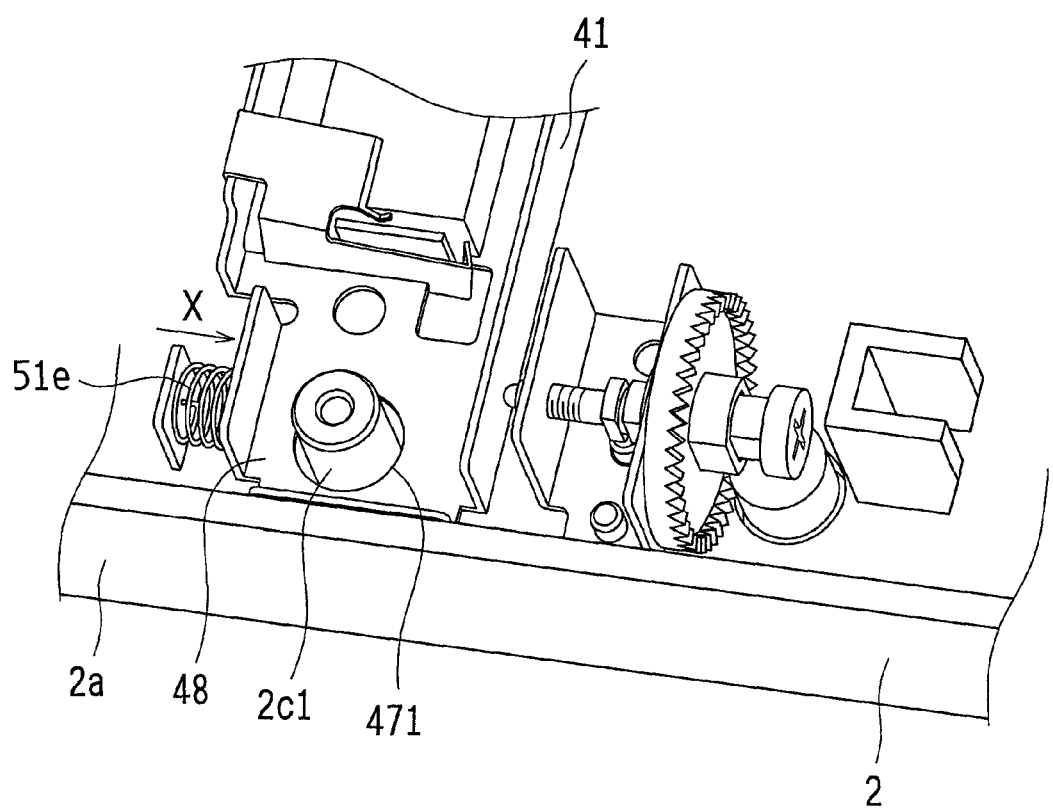
FIG. 12 is an enlarged perspective view of a main part of an exposure unit illustrating a relationship between a second fθ lens and an adjusting unit according to another embodiment.

The spring, which is one configuration of the biasing portion 511 illustrated in FIG. 12, is a compression spring 51e disposed outside of the support body 41. The spring is biased in an arrow X direction illustrated in FIG. 12. Use of the compression spring 51e eliminates the need for the kick spring 51a. Similarly to the embodiment illustrated in FIGS. 9 and 10, the other end portion 48 of the support body 41 has the hole 471 to insert the second protrusion 2c1. The hole 471 is used for disposing the support body 41 onto the housing 2a of the exposure unit 2.

Figure 13:
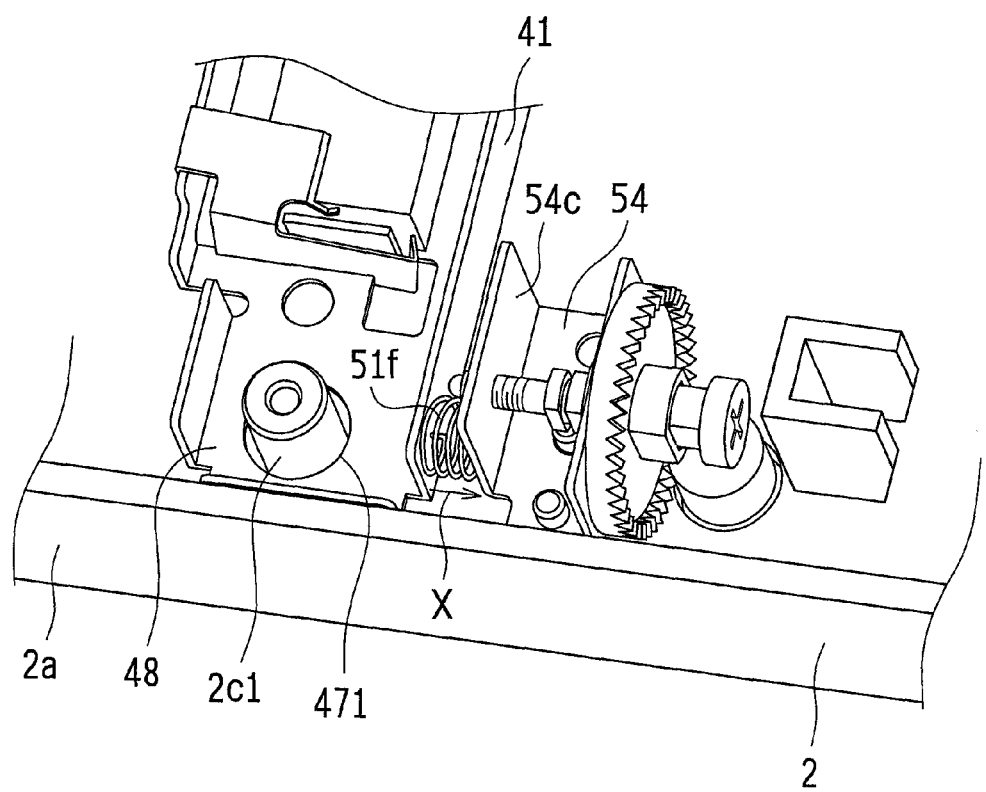
FIG. 13 is an enlarged perspective view of a main part of an exposure unit illustrating a relationship between a second fθ lens and an adjusting unit according to another embodiment.

The biasing portion illustrated in FIG. 13 is a pulling spring 51f that is disposed on the wall portion 54c of the shaft supporting portion 54 outside of the support body 41. The biasing portion is biased in the arrow X direction in FIG. 13. Use of the pulling spring 51f eliminates the need for the kick spring 51a. Similarly to the embodiment illustrated in FIGS. 9 and 10, the other end portion 48 of the support body 41 has the hole 471 to insert the second protrusion 2c1. The hole 471 is used for disposing the support body 41 onto the housing 2a of the exposure unit 2.

The configuration of the adjusting unit 40 is not limited to the aforementioned embodiment. Another configuration is also possible as described below.

Embodiment 2

Next, an image forming apparatus 1 according to Embodiment 2 will be described by referring to the accompanying drawings. The image forming apparatus 1 according to Embodiment 2 differs in configuration of the adjusting unit 40, compared with that of aforementioned Embodiment 1. The identical numerals designate identical elements. In Embodiment 2, configurations different from those of the aforementioned Embodiment 1 will be described below. Therefore, the identical elements will not be further elaborated here. The identical configurations as those of Embodiment 1 have operations, effects, and modifications similarly to the aforementioned Embodiment 1.

The image forming apparatus according to Embodiment 2 includes the exposure unit 2 where the adjusting unit 40 is disposed. The adjusting unit 40 adjusts the optical axis of the laser beam irradiated on the photoreceptor drum 4 via the second fθ lens 38. The adjusting unit 40 turns and moves the other end portion 38b side around the one end portion 38a of the second fθ lens 38 as an axis, adjusts the inclination of the optical axis of the laser beam emitted from the second fθ lens 38, and then corrects the inclination of the scanning line on the image plane (the drum surface) of the photoreceptor drum 4.

As illustrated in FIGS. 14 to 17, the adjusting unit 40 includes the support body 41 where the second fθ lens 38 is mounted and the displacement portion 50 that displaces the second fθ lens 38.

Figure 14:
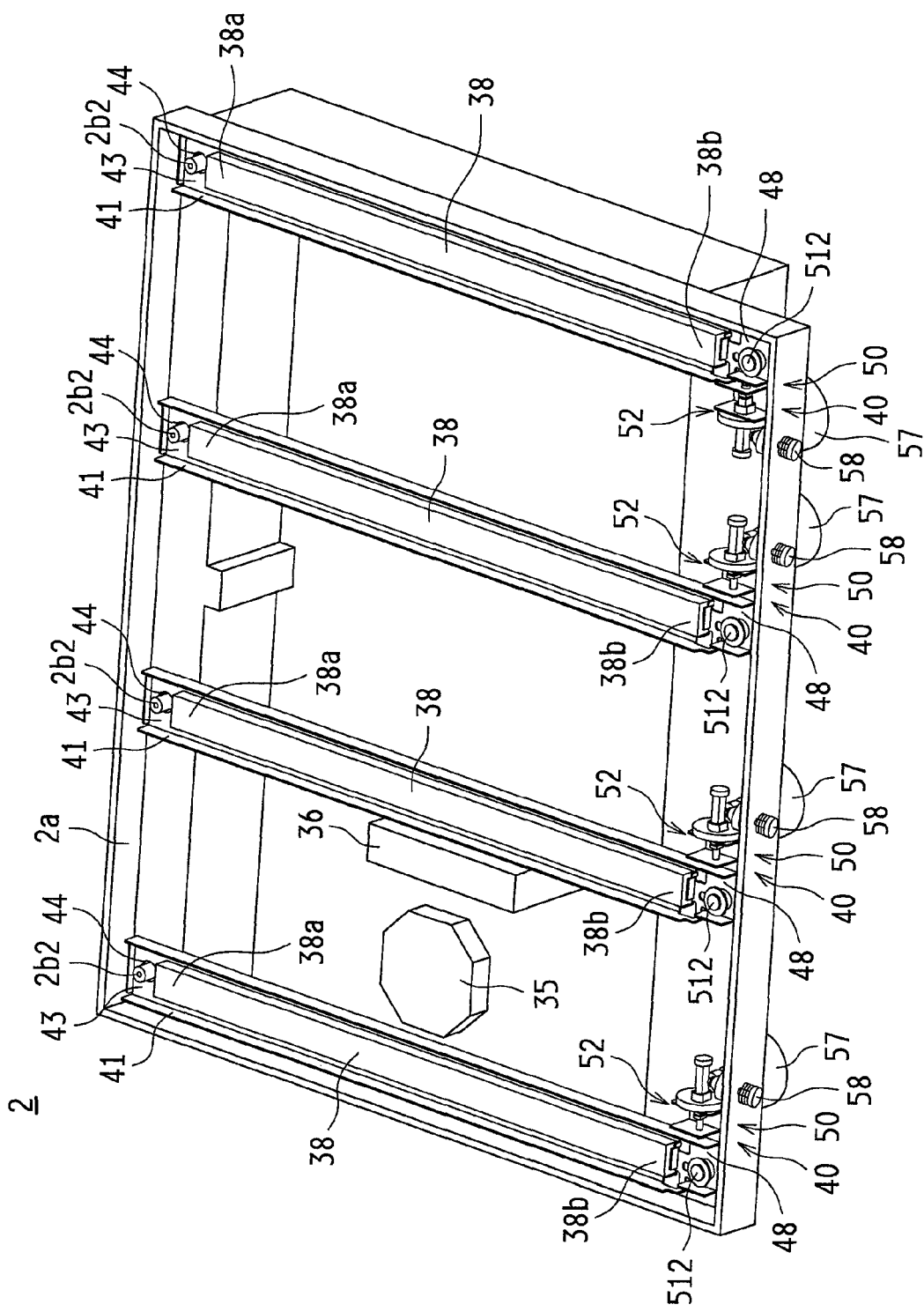
FIG. 14 is a schematic perspective view of an exposure unit illustrating positions of second fθ lenses.
Figure 15:
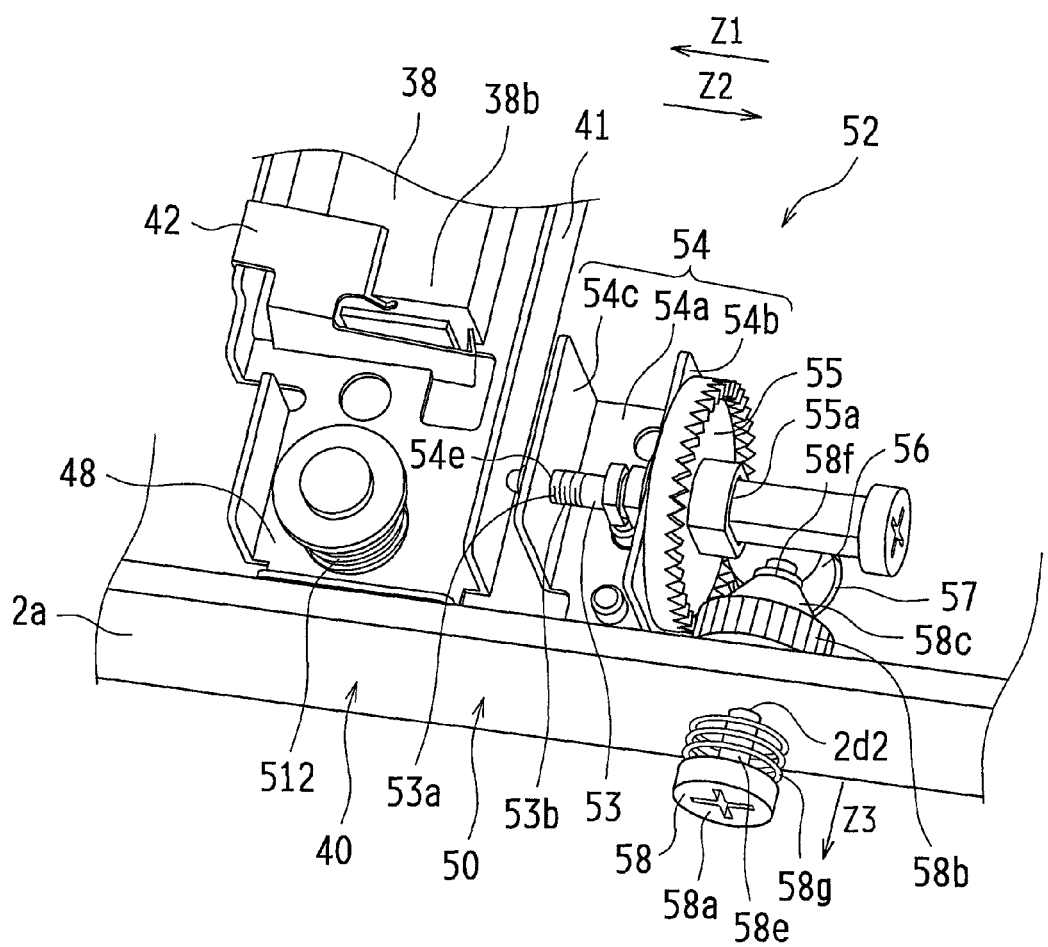
FIG. 15 is an enlarged perspective view of a main part of the exposure unit illustrating a relationship between a second fθ lens and an adjusting unit.

The support body 41 is an elongated member that is formed by injection molding using, for example, a resin material. As illustrated in FIG. 15, the second fθ lens 38 is secured with the plate spring 42. As illustrated in FIG. 14, the support body 41 has the one end portion 43 that becomes a mounting portion of the one end portion 38a of the second fθ lens 38. On the one end portion 43, the shaft hole 44 is formed to pivotally support the housing 2a of the exposure unit 2. A protrusion 2b2 of the housing 2a of the exposure unit 2 is inserted into the shaft hole 44. The one end portion 43 of the support body 41 is secured to the housing 2a of the exposure unit 2.

The displacement portion 50 is a mechanism that allows the other end portion 48 of the support body 41 to turn around the one end portion 43 of the support body 41 as an axis. The displacement portion 50 includes a kick spring 512 and the adjustment portion 52. The kick spring 512 is disposed on the other end portion 48 of the support body 41 that becomes a mounting portion of the other end portion 38b of the second fθ lens 38. The kick spring 512 biases the other end portion 48 of the support body 41 counterclockwise around the one end portion 43 of the support body 41 as an axis. The adjustment portion 52 is disposed outside of the support body 41 (its other end portion 48), and adjusts the optical axis of the laser beam. In Embodiment 2, the one end portion 43 of the support body 41 corresponds to the one end portion 38a side of the second fθ lens 38 while the other end portion 48 of the support body 41 corresponds to the other end portion 38b side of the second fθ lens 38. While in Embodiment 2, the kick spring 512 biases the other end portion 48 of the support body 41 counterclockwise around the one end portion 43 of the support body 41 as an axis, this should not be construed in a limiting sense. The biasing direction may be preliminarily set corresponding to an embodiment.

The kick spring 512 is used to bias the second fθ lens 38 in a pre-set direction (to bias the other end portion 48 of the support body 41 counterclockwise around the one end portion 43 of the support body 41 as an axis). This biasing of the kick spring 512 allows the support body 41 (the second fθ lens 38) to counter oppose the shaft portion 53. The kick spring 512 not only biases the support body 41, which supports the second fθ lens 38, but also presses the other end portion 38b side of the second fθ lens 38. In Embodiment 2, the other end portion 48 of the support body 41 corresponds to the other end portion 38b side of the second fθ lens 38.

As illustrated in FIGS. 14 to 17, the adjustment portion 52 includes the turnable shaft portion 53, the shaft supporting portion 54, the first gear 55 (the first turning portion of the present invention), the second gear 56 (the second turning portion of the present invention), and the driving portion 57. The shaft supporting portion 54 supports the shaft portion 53. The first gear 55 engages the shaft portion 53, and turns the shaft portion 53 around a turning axis of the shaft portion 53. The second gear 56 has a turning axis (a virtual axis) intersecting with the turning axis (the shaft portion 53) of the first gear 55. The second gear 56 fits the first gear 55, and turns the first gear 55. The driving portion 57 turnably drives the second gear 56. In Embodiment 2, the combination of the first gear 55 and the second gear 56 constitutes a turning portion.

The turning portion is turned by the driving portion 57. The shaft portion 53 is turned by the turning portion.

The shaft portion 53 bidirectionally moves in the first direction Z1 (see FIGS. 15 to 17) where the shaft portion 53 approaches the second fθ lens 38, and in the second direction Z2 (see FIGS. 15 to 17) where the shaft portion 53 moves away from the second fθ lens 38 while turning. The biasing of the kick spring 512 makes the shaft portion 53 to counter oppose the support body 41 (the second fθ lens 38 mounted on the support body 41) where a force (pressing) is applied to the other end portion 48 in a counterclockwise direction around the one end portion 43 as an axis. In the shaft portion 53, a force may be applied in an inverse direction of the biasing direction (a counterclockwise direction) of the kick spring 512. The shaft portion 53 and the support body 41 (the second fθ lens 38) are disposed in a state where the forces are balanced. The shaft portion 53 has a distal end with a hemisphere shape and is disposed in contact with the support body 41. The distal end 53a of the shaft portion 53 includes the male thread portion 53b (the screw portion of the shaft portion of the present invention) where the grooves of the male screw are formed. At least the base end 53c of the shaft portion 53 has a D shape in a cross-sectional view (hereinafter referred to as a D shape), and fits the through-hole 55a of the first gear 55 (which is described below). Accordingly, the base end 53c of the shaft portion 53 has the D shape, thus holding the engagement with the first gear 55 without being affected by turning of the shaft portion 53 and the first gear 55.

Figure 16:
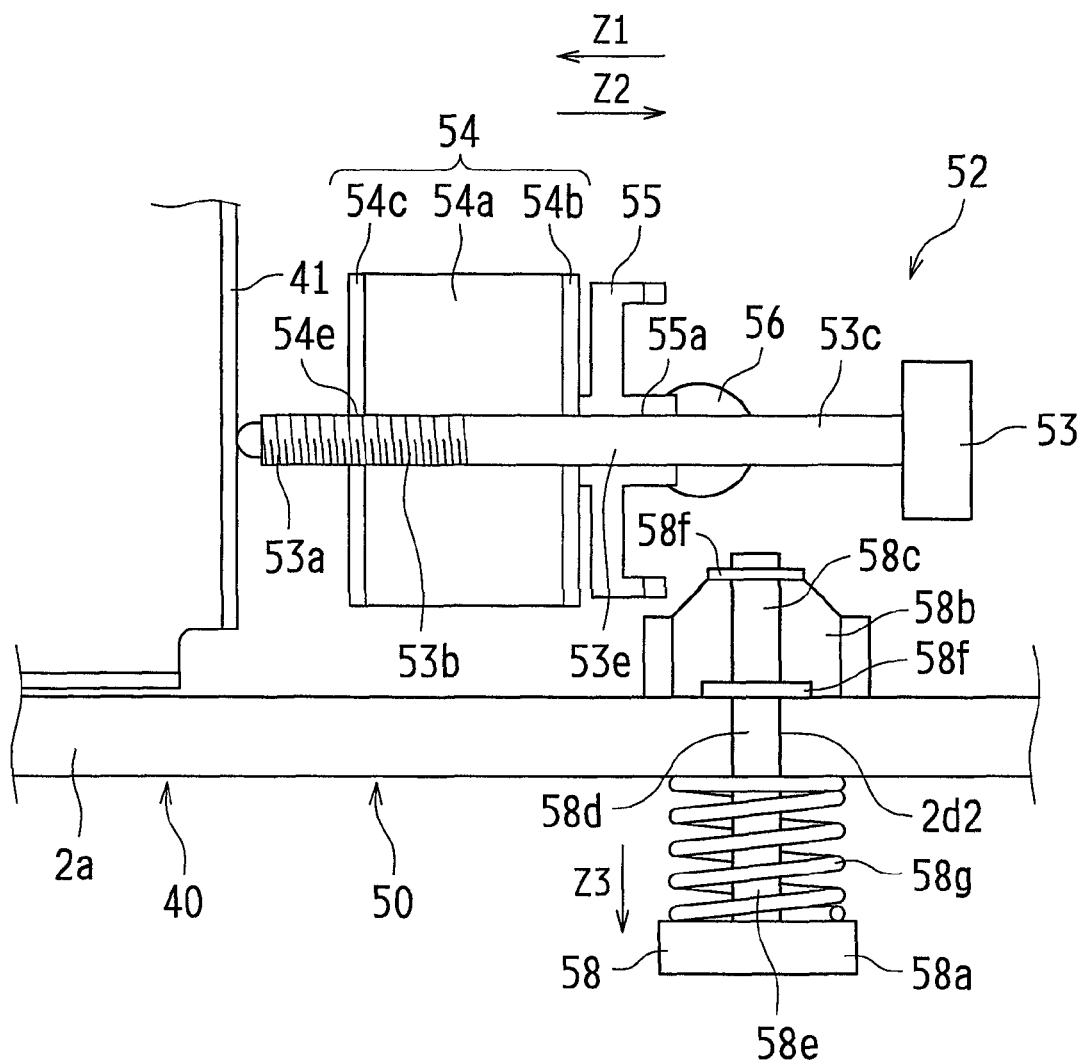
FIG. 16 is a schematic diagram of the adjusting unit illustrating a schematic configuration of the adjusting unit where the adjusting unit corresponding to FIG. 15 is shown from a plan view when performing an automatic optical axis adjustment.
Figure 17:
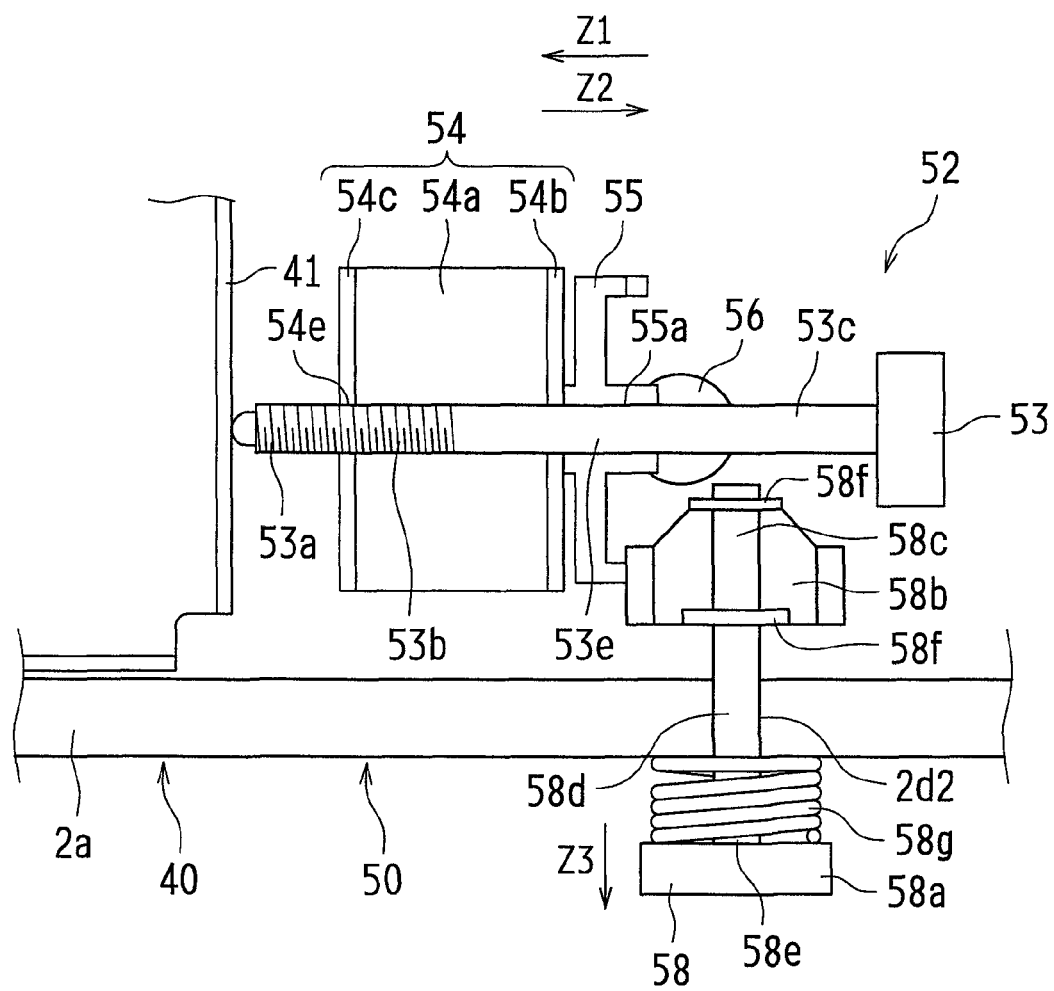
FIG. 17 is a schematic diagram of the adjusting unit illustrating the schematic configuration of the adjusting unit where the adjusting unit corresponding to FIG. 15 is shown from the plan view when performing a manual optical axis adjustment.

The shaft supporting portion 54 supports the shaft portion 53, and moves the shaft portion 53 itself in accordance with turning of the shaft portion 53. As illustrated in FIGS. 15 to 17, the shaft supporting portion 54 includes the bottom surface portion 54a and two wall portions 54b and 54c. One wall portion 54b of the shaft supporting portion 54 includes the inserting portion 54d that allows the shaft portion 53 to be inserted while the other wall portion 54c includes the female thread portion 54e (the screw portion of the shaft supporting portion of the present invention) that allows the shaft portion 53 to be inserted and to turnably fit the male thread portion 53b of the shaft portion 53. The female thread portion 54e of the shaft supporting portion 54 fits the male thread portion 53b of the shaft portion 53. This allows securing the shaft portion 53 to the shaft supporting portion 54.

As illustrated in FIGS. 15 to 17, the first gear 55 is a crown gear that engages the shaft portion 53 and turns the shaft portion 53 around a turning axis of the shaft portion 53. The shaft portion 53 is disposed to be inserted into the through-hole 55a of the center portion of the first gear 55. The shaft portion 53 turns in synchronization with turning of the first gear 55. The first gear 55 is a single member in common between manual optical axis adjustment and automatic optical axis adjustment and used for both optical axis adjustments, and functions as a common optical axis adjusting portion.

As illustrated in FIGS. 15 to 17, the second gear 56 is a spur gear that turns the first gear 55. The axial direction of the rotation shaft that functions as the axis (a virtual axis) of the turning is in an intersecting state where the axial direction is axially orthogonal to the rotation shaft (the shaft portion 53) of the first gear 55. The second gear 56 fits the first gear 55 and is turned by driving of the driving portion 57.

As illustrated in FIGS. 15 to 17, the driving portion 57 is a motor and is disposed outside of the housing 2a of the exposure unit 2. The driving portion 57 turns the second gear 56, and the excitation of the driving portion 57 is switched on/off. Accordingly, the driving portion 57 is not constantly excited. The driving portion 57 is excited at least when an optical axis of the second fθ lens 38 is adjusted. That is, only when the optical axis of the second fθ lens 38 is automatically adjusted, the driving portion 57 may be excited. In a state where the second fθ lens 38 is displaced and the optical axis of the laser beam is not adjusted except when the optical axis of the second fθ lens 38 is automatically adjusted, the driving portion 57 is not excited. This prevents heat generation of the motor of the driving portion 57.

In the adjustment portion 52, as illustrated in FIG. 16, driving of the driving portion 57 turns the second gear 56. Turning of the second gear 56 turns the first gear 55. Turning of the first gear 55 turns the shaft portion 53. Additionally, the male thread portion 53b of the shaft portion 53 turnably fits the female thread portion 54e of the shaft supporting portion 54. Thus, the shaft portion 53 moves in the direction (the first direction Z1) where the shaft portion 53 approaches the support body 41 or in the direction (the second direction Z2) where the shaft portion 53 moves away from the support body 41 based on the turning direction of the first gear 55. This movement of the shaft portion 53 turns the other end portion 48 of the support body 41 in contact with the distal end of the shaft portion 53 around the one end portion 43 of the support body 41 as an axis, and displaces the second fθ lens 38 mounted on the support body 41. This displacement of the second fθ lens 38 adjusts the optical axis of the laser beam irradiated on the photoreceptor drum 4 from the second fθ lens 38. The optical axis adjustment with the first gear 55, the second gear 56, and the driving portion 57 is referred to as an automatic optical axis adjustment that does not need any manual operation (external operation) by a user.

The adjusting unit 40 (specifically, the adjustment portion 52) includes a manual adjustment portion 58 (a mechanism for manual optical axis adjustment) other than the aforementioned mechanism (the mechanism for automatic optical axis adjustment) that adjusts the optical axis of the laser beam without any manual operation. The manual adjustment portion 58 adjusts the optical axis of the laser beam by an external operation (the manual operation by a user). The adjusting unit 40 allows switching the manual optical axis adjustment and the automatic optical axis adjustment.

The manual adjustment portion 58 allows a manual operation from outside of the housing 2a of the exposure unit 2. As illustrated in FIGS. 15 to 17, the manual adjustment portion 58 includes a manual shaft portion 58a and a manual gear 58b. The manual shaft portion 58a is turnable by a manual operation from outside of the housing 2a of the exposure unit 2. The manual gear 58b synchronizes turning of the manual shaft portion 58a. The manual shaft portion 58a functions as a turning axis of the manual gear 58b.

The manual shaft portion 58a is disposed across from outside to inside of the housing 2a of the exposure unit 2. The manual shaft portion 58a is inserted into a through-hole 2d2 formed in the housing 2a. The manual shaft portion 58a has a distal end 58c, which is disposed inside the housing 2a, a center portion 58d, which is disposed in the through-hole 2d2, and a base end 58e, which is disposed outside the housing 2a. The distal end 58c of the manual shaft portion 58a includes the manual gear 58b that employs two E-rings 58f. The base end 58e of the manual shaft portion 58a, which is disposed outside of the housing 2a of the exposure unit 2, includes a compression spring 58g (a manual biasing member of the present invention) that is wound around the shaft. The compression spring 58g biases the manual shaft portion 58a from the distal end 58c in a direction (a direction Z3) toward the base end 58e.

The manual gear 58b is a gear that can fit the first gear 55. As illustrated in FIG. 16, in the case where the manual shaft portion 58a is biased in the direction Z3 by the compression spring 58g without any manual operation, the manual shaft portion 58a is separated from the first gear 55 without fitting. On the other hand, the manual shaft portion 58a is pushed from the base end 58e toward the distal end 58c against the biasing of the compression spring 58g by a manual operation of the user. This displaces the manual gear 58b from a position illustrated in FIG. 16 to a position illustrated in FIG. 17. As illustrated in FIG. 17, the manual gear 58b fits the first gear 55 of the turning portion. In a state where the manual gear 58b fits the first gear 55, the user turns the manual shaft portion 58a so as to turn the first gear 55 via the manual gear 58b (the turning portion). This allows adjusting the optical axis of the laser beam. That is, the adjusting unit 40 allows the user to perform the manual optical axis adjustment.

As described above, the adjusting unit 40 includes the shaft portion 53, the shaft supporting portion 54, the first gear 55, the second gear 56, the driving portion 57, and the manual adjustment portion 58. In the case where the adjusting unit 40 automatically adjusts the optical axis of the laser beam without any manual operation (automatic optical axis adjustment), as illustrated in FIG. 16, the adjusting unit 40 adjusts the optical axis such that the manual gear 58b does not fit the first gear 55 in a state where the manual gear 58b of the manual adjustment portion 58 is separated from the first gear 55. In the case where the adjusting unit 40 adjusts the optical axis of the laser beam with the manual operation (manual optical axis adjustment), as illustrated in FIG. 17, the adjusting unit 40 adjusts the optical axis by making the manual gear 58b of the manual adjustment portion 58 fit the first gear 55. Therefore, the adjusting unit 40 according to Embodiment 2 allows switching the automatic optical axis adjustment and the manual optical axis adjustment, and ensures the exposure unit 2 with a high degree of freedom of the optical axis adjustment.

The aforementioned adjusting unit 40 allows the shaft portion 53 (especially, the male thread portion 53b) and the shaft supporting portion 54 (especially, the female thread portion 54e) to damp a turning force that is applied to the shaft portion 53 by an external force (such as vibration and impact) applied to the adjusting unit 40 from outside. For example, even when the external force is applied to the shaft portion 53, at least a part of the external force is converted into a friction force or a resisting force in a fitting portion where the male thread portion 53b fits the female thread portion 54e. As a result, this damps a moving force (specifically, the turning force applied to the shaft portion 53) that moves the shaft portion 53 by the external force. In the adjusting unit 40 according to Embodiment 2 that has these operations and effects, the shaft portion 53 (especially, the male thread portion 53b) fits the shaft supporting portion 54 (especially, the female thread portion 54e) to damp the turning force applied to the shaft portion 53 by the external force. The driving portion 57 turns the shaft portion 53 via the turning portion, thus displacing the second fθ lens 38. That is, this prevents unnecessary turning of the shaft portion 53 and allows necessary turning of the shaft portion 53 only. As a result, this allows adjustment of a displacement amount of the second fθ lens 38 corresponding only to a necessary turning amount of the shaft portion 53.

The rotation shaft (the shaft portion 53) of the first gear 55 has the axial direction orthogonal to the axial direction of the turning axis (the virtual axis in Embodiment 2) of the second gear 56. The external force applied to the first gear 55 (especially, the shaft portion 53) easily transmits in the axial direction of the shaft portion 53 while the external force has difficulty in transmitting in another direction (especially, a direction perpendicular to the axial direction of the shaft portion 53). Accordingly, this damps transmission of the external force, which is applied to the first gear 55, to the second gear 56. As a result, this reduces (prevents) an external force from being applied to the driving portion 57 from the first gear 55 via the second gear 56. The driving of the driving portion 57 turns the second gear 56, and the turning of the second gear 56 turns the first gear 55. Thus, the driving portion 57 is not directly coupled to the shaft portion 53. This reduces a transmission of the external force, which is applied to the first gear 55, to the driving portion 57. In Embodiment 2, only when the optical axis is automatically adjusted, the driving portion 57 is allowed to be driven. This increases time when the driving portion 57 is not excited. This prevents heat generation of the driving portion 57 due to excitation except when the optical axis of the second fθ lens 38 is automatically adjusted.

With the above-described combination of the male thread portion 53b and the female thread portion 54e and the above-described combination of the first gear 55 and the second gear 56, a turning damping unit is constituted. The turning damping unit damps a turning force (an unnecessary moving force of the shaft portion 53) applied to the shaft portion 53 by the external force.

As described above, with the exposure unit 2 according to Embodiment 2, the adjusting unit 40 allows switching the manual optical axis adjustment and the automatic optical axis adjustment. The adjusting unit 40 displaces the second fθ lens 38 to adjust the inclination of the optical axis of the laser beam, which is emitted from the second fθ lens 38. Correcting the inclination of the optical axis of the laser beam employs adjusting the optical axis with a manual operation (manual optical axis adjustment) and automatically adjusting the optical axis without any manual operation (automatic optical axis adjustment). This ensures the exposure unit 2 that functions as a light scanning device with a high degree of freedom in the optical axis adjustment.

With the image forming apparatus 1 according to Embodiment 2, the exposure unit 2, which is a light scanning device, is disposed. This allows switching the manual optical axis adjustment and the automatic optical axis adjustment. As a result, correcting the inclination of the optical axis of the laser beam employs adjusting the optical axis with a manual operation and automatically adjusting the optical axis without any manual operation. This ensures a high degree of freedom in the optical axis adjustment.

Embodiment 2 facilitates the correction (the manual optical axis adjustment and the automatic optical axis adjustment) of the inclination of the optical axis without taking the exposure unit 2 out of the image forming apparatus 1.

The common optical axis adjusting portion (the first gear 55 in Embodiment 2), which is used in both optical axis adjustments of the manual optical axis adjustment and the automatic optical axis adjustment, is disposed. This eliminates the need for disposing an adjustment portion for the manual optical axis adjustment and an adjustment portion for the automatic optical axis adjustment separately. This ensures a downsized mechanism for the optical axis adjustment without complicating the mechanism.

When performing the automatic optical axis adjustment, the driving portion 57 turns the shaft portion 53 via the first gear 55. This allows the automatic optical axis adjustment without any manual operation. When performing the manual optical axis adjustment, the manual adjustment portion 58 turns the shaft portion 53 via the first gear 55. This allows the manual optical axis adjustment with a manual operation.

The base end 58e of the manual shaft portion 58a is disposed outside of the housing 2a of the exposure unit 2. Thus, pressing the base end 58e by a user (a manual operation) allows the manual optical axis adjustment. In a state where the user does nothing (without any manual operation), the automatic optical axis adjustment is possible. As a result, this ensures facilitated correction that is manually and automatically performed on the inclination of the optical axis without taking the exposure unit 2 out of the image forming apparatus 1.

With this configuration, the manual gear 58b does not always fit the turning portion (by the compression spring 58g). The manual gear 58b fits the turning portion as necessary. As a result, when the automatic optical axis adjustment is performed, this drives the driving portion 57 only with a torque necessary for turning of the shaft portion 53 without considering whether or not the manual gear 58b fits the turning portion. Thus, this allows the automatic optical axis adjustment.

The compression spring 58g, which is the manual biasing member, biases the manual shaft portion 58a in the direction toward the base end 58e from the distal end 58c. This prevents the manual gear 58b from fitting the turning portion (the first gear 55) when the manual optical axis adjustment is not necessary, and this allows the manual gear 58b to fit the first gear 55 only when the manual optical axis adjustment is performed.

The male thread portion 53b is disposed on the shaft portion 53. The female thread portion 54e is disposed on the shaft supporting portion 54. The male thread portion 53b of the shaft portion 53 and the female thread portion 54e of the shaft supporting portion 54 constitute the turning damping unit. Fitting of the male thread portion 53b of the shaft portion 53 and the female thread portion 54e of the shaft supporting portion 54 damps the turning force (specifically, the turning force by turning in accordance with moving of the shaft portion 53) applied to the shaft portion 53 by the external force. Also, the driving portion 57 turns the shaft portion 53 via the turning portion, thus displacing the second fθ lens 38. That is, this prevents unnecessary turning of the shaft portion 53 and allows necessary turning of the shaft portion 53 only. As a result, this allows adjustment of a displacement amount of the second fθ lens 38 corresponding only to a necessary turning amount of the shaft portion 53.

The biasing of the kick spring 512 allows the second fθ lens 38 to counter oppose the shaft portion 53. Therefore, when correcting the inclination of the optical axis of the laser beam is not necessary, this prevents the second fθ lens 38 from being displaced. Even in a state where a force of the second fθ lens 38 and a force of the shaft portion 53 are not balanced due to an external force, the turning damping unit allows damping the external force. This prevents the external force from transmitting to the driving portion 57.

An axial direction of the rotation shaft (the shaft portion 53) of the first gear 55 is orthogonal to an axial direction of the turning axis of the second gear 56. The external force applied to the first gear 55 (especially, the shaft portion) easily transmits in the axial direction of the shaft portion 53 while the external force has difficulty in transmitting in another direction (preferably, a direction perpendicular to the axial direction of the shaft portion 53). Accordingly, this damps a transmission of the external force, which is applied to the first gear 55, to the second gear 56. As a result, this reduces (prevents) an external force from being applied to the driving portion 57 from the first gear 55 via the second gear 56. The driving of the driving portion 57 turns the second gear 56, and the turning of the second gear 56 turns the first gear 55. Thus, the driving portion 57 is not directly coupled to the shaft portion 53. This reduces a transmission of the external force, which is applied to the first gear 55, to the driving portion 57.

With this configuration, only when the optical axis is automatically adjusted, the driving portion 57 is allowed to be driven. This increases time when the driving portion 57 is not excited. This prevents heat generation of the driving portion 57 due to excitation except when the optical axis of the second fθ lens 38 is automatically adjusted (for example, when the manual optical axis adjustment is performed or during waiting).

The kick spring 512 pushes the other end portion 38b side of the second fθ lens 38. The kick spring 512 not only prevents the second fθ lens 38 from being displaced when the inclination of the optical axis of the laser beam does not need to be corrected, but also allows disposing the second fθ lens 38 without securing the other end portion 38b side of the second fθ lens 38.

The other end portion 38b side of the second fθ lens 38 is turnable around the one end portion 38a side of the second fθ lens 38 as an axis. Accordingly, the adjusting unit 40 turns only the other end portion 38b side of the second fθ lens 38 so as to displace the second fθ lens 38. This easily adjusts the optical axis of the laser beam.

The driving portion 57 is disposed outside the housing 2a of the exposure unit 2. This suppresses heat, which is generated from the driving portion 57, from being filled inside of the housing 2a of the exposure unit 2.

Embodiment 2 employs the second fθ lens 38 as the optical member. This should not be construed in a limiting sense. Any other configuration is possible insofar as the optical member is interposed to irradiate the scan object (the photoreceptor drum 4) with the laser beam.

In Embodiment 2, the shaft portion 53 includes the male thread portion 53b where the grooves of the male screw are formed. The shaft supporting portion 54 includes the female thread portion 54e that fits the male thread portion 53b of the shaft portion 53. These configurations of the screw portions are not limited to this. The following configuration is also possible. The shaft portion 53 includes the female thread portion 54e where the grooves of the female screw are disposed. The shaft supporting portion 54 includes the male thread portion 53b that fits the female thread portion 54e of the shaft portion 53. That is, the shaft portion 53 includes the screw portion where the grooves of the screw are formed. The shaft supporting portion 54 includes the screw portion that turnably fits the screw portion of the shaft portion 53.

In Embodiment 2, the axial direction of the first gear 55 is orthogonal to the axial direction of the second gear 56, which is a preferred configuration. For example, the axial direction of the first gear 55 and the axial direction of the second gear 56 may form an angle of 90±10 degrees (in an approximately orthogonal state).

Figure 18:
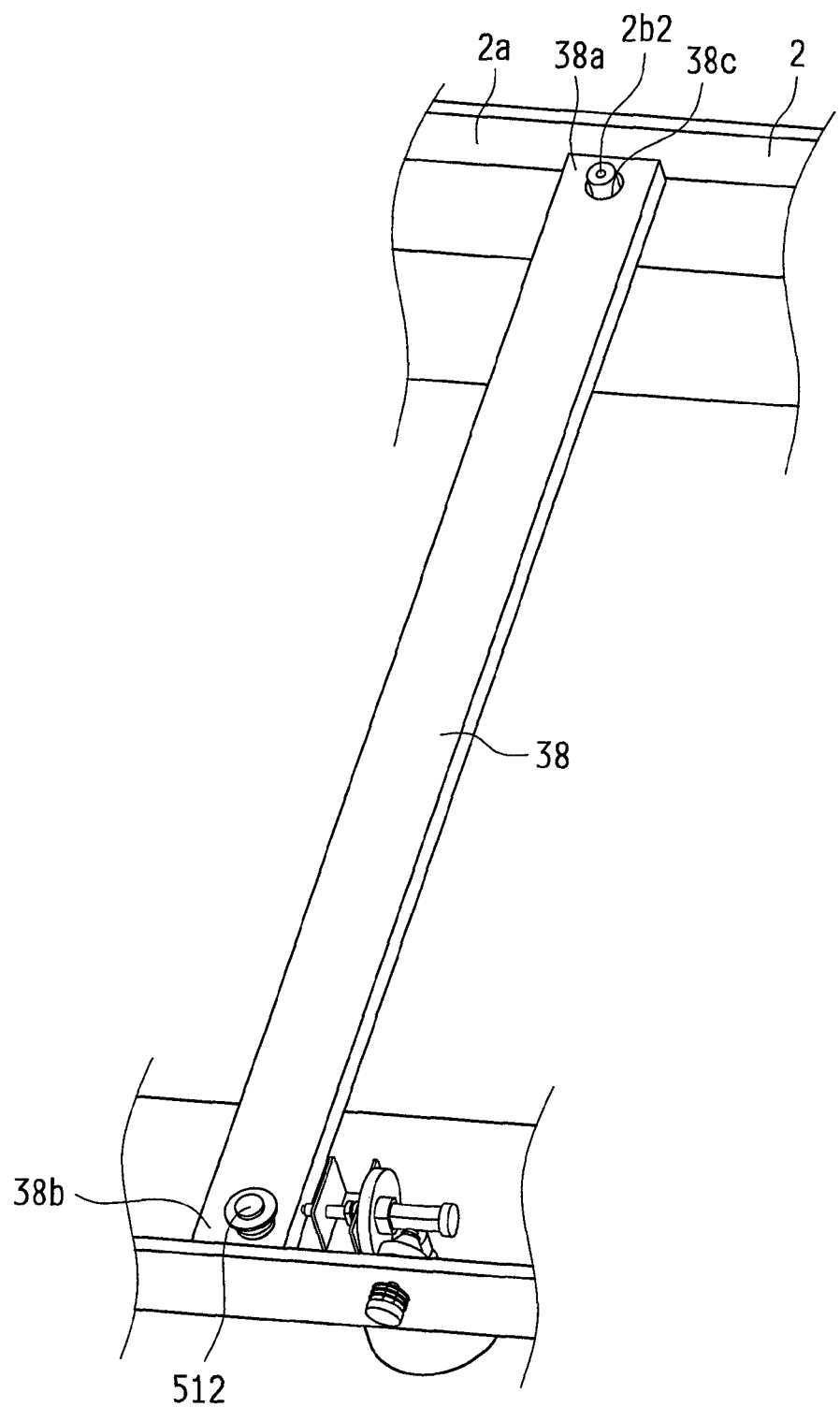
FIG. 18 is an enlarged perspective view of a main part of an exposure unit illustrating a relationship between a second fθ lens and an adjusting unit according to another embodiment.

While in Embodiment 2, the exposure unit 2 includes the second fθ lens 38 mounted on the support body 41, this should not be construed in a limiting sense. As illustrated in FIG. 18, the exposure unit 2 may include the second fθ lens 38 alone without the support body 41.

The second fθ lens 38 illustrated in FIG. 18 has the one end portion 38a where the shaft hole 38c is formed corresponding to the shaft hole 44 of the support body 41. The protrusion 2b2 of the housing 2a of the exposure unit 2 is inserted into the shaft hole 38c. The one end portion 38a of the second fθ lens 38 is secured to the housing 2a of the exposure unit 2. The kick spring 512 is disposed on the other end portion 38b of the second fθ lens 38. In the embodiment in FIG. 18, the one end portion 38a of the second fθ lens 38 corresponds to the one end portion 38a side of the second fθ lens 38 while the other end portion 38b of the second fθ lens 38 corresponds to the other end portion 38b side of the second fθ lens 38.

While in Embodiment 2, the turning portion to turn the shaft portion 53 includes the first gear 55, the second gear 56, and the driving portion 57, this should not be construed in a limiting sense. For example, as illustrated in FIG. 19, a configuration without the second gear 56 is possible insofar as the configuration converts the driving force from the driving portion 57 into a turning force, as the turning portion.

Figure 19:
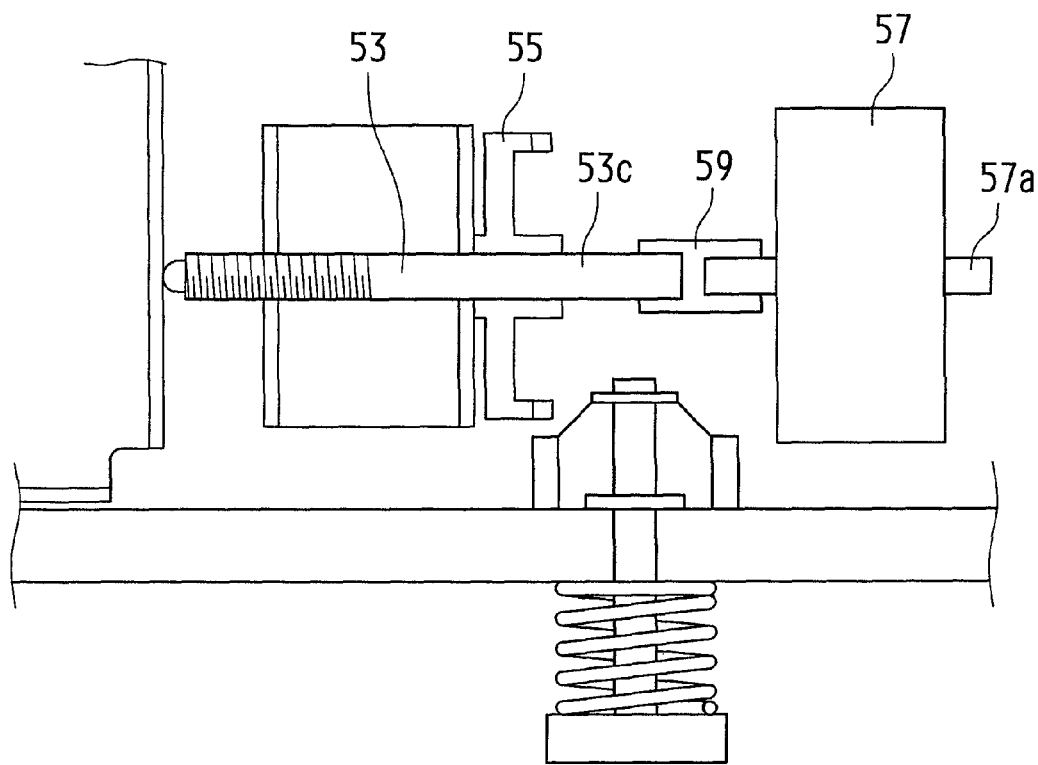
FIG. 19 is a schematic diagram illustrating a schematic configuration of an adjusting unit corresponding to FIG. 16 where the adjusting unit according to another embodiment is shown from the plan view.

A turning portion illustrated in FIG. 19 includes the first gear 55, a driving portion 57, and a coupling portion 59. The coupling portion 59 couples the shaft portion 53 to a driving shaft 57a of the driving portion 57. In the shaft portion 53 illustrated in FIG. 19, the base end 53c is formed to axially extend from the shaft portion 53 according to Embodiment 2. The coupling portion 59 is a coupling. The driving portion 57 is a motor. In a turning portion illustrated in FIG. 19, the shaft portion 53 is coupled to the driving shaft 57a of the driving portion 57 by the coupling portion 59. The driving shaft 57a of the driving portion 57, the coupling portion 59, and the shaft portion 53 convert the driving force of the driving portion 57 into a rotational force of the shaft portion 53. The driving portion 57 turns the shaft portion 53.

The turning portion illustrated in FIG. 19, the first gear 55 and the coupling portion 59 are disposed as the turning damping unit. Accordingly, this allows the coupling portion 59, which couples the turning axis (the shaft portion 53) of the first gear 55 to the driving shaft 57a of the driving portion 57, to damp the external force applied to the first gear 55 in the coupling portion 59. As a result, this damps (preferably, prevents) the external force applied to the driving portion 57. Specifically, this damps the external force applied to the coupling portion 59 from the first gear 55 by an external force, thus preventing the external force applied to the driving portion 57 from the coupling portion 59. This prevents the external force applied to the first gear 55 from transmitting to the driving portion 57.

While Embodiment 2 employs the kick spring 512, this should not be construed in a limiting sense. Any other configuration is possible insofar as the biasing portion biases the other end portion 48 of the support body 41 counterclockwise around the one end portion 43 of the support body 41 as an axis. For example, springs illustrated in FIGS. 20 and 21 may be employed.

Figure 20:
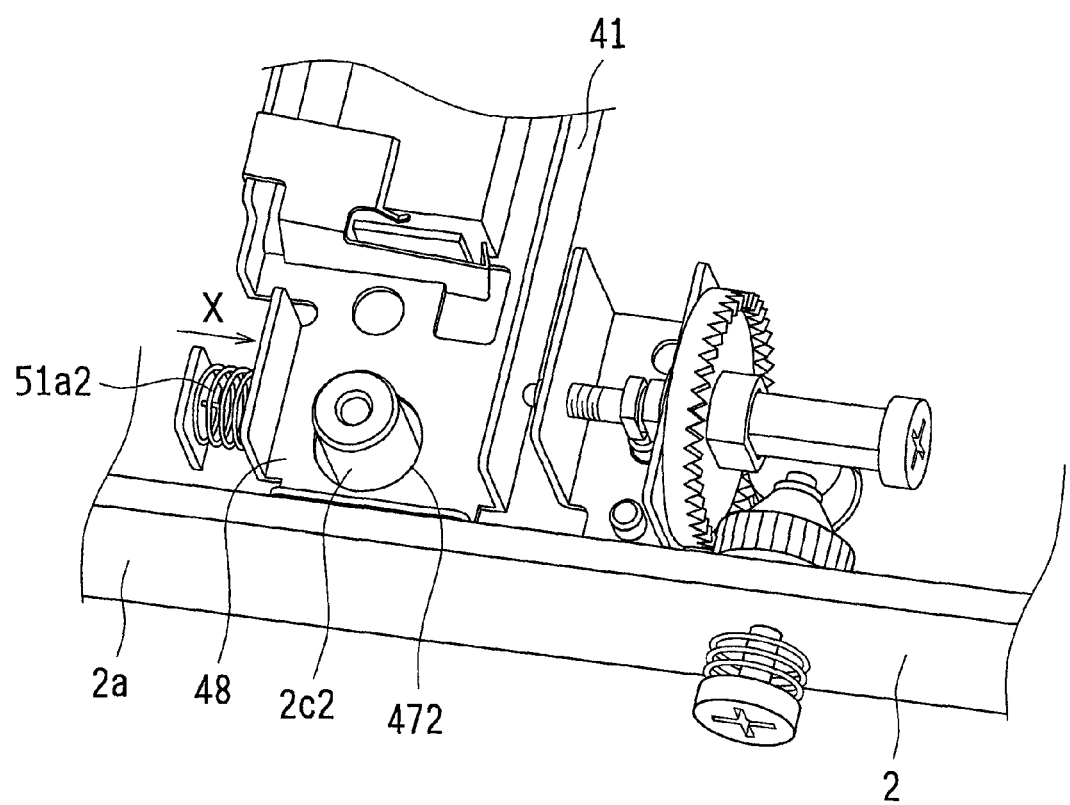
FIG. 20 is an enlarged perspective view of a main part of an exposure unit illustrating a relationship between a second fθ lens and an adjusting unit according to another embodiment corresponding to FIG. 15.

The biasing portion illustrated in FIG. 20 is a compression spring 51a2 disposed outside of the support body 41, and is biased in an arrow X direction in FIG. 20. Use of the compression spring 51a2 eliminates the need for the kick spring 512. The other end portion 48 of the support body 41 has a shaft hole 472 to insert a positioning protrusion 2c2 that is used for disposing the support body 41 onto the housing 2a of the exposure unit 2.

Figure 21:
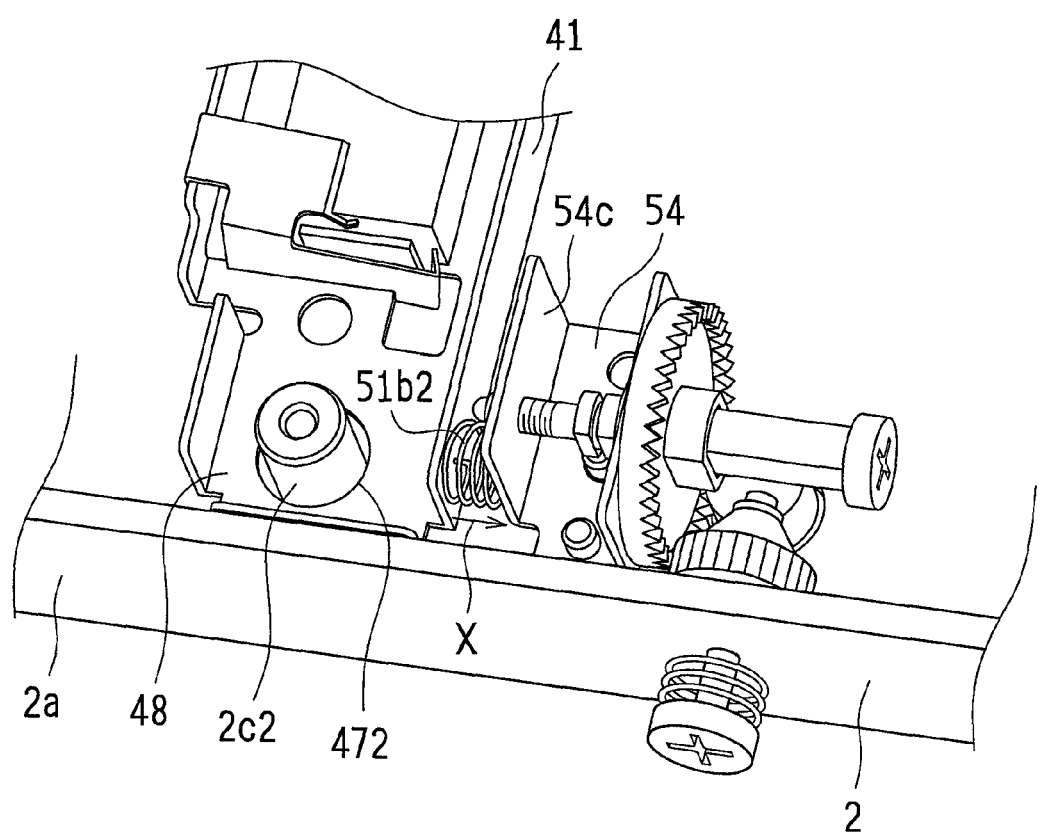
FIG. 21 is an enlarged perspective view of the main part of the exposure unit illustrating the relationship between the second fθ lens and the adjusting unit according to the other embodiment corresponding to FIG. 15.

The biasing portion illustrated in FIG. 21 is a pulling spring 51b2 that is disposed on the wall portion 54c of the shaft supporting portion 54, which is the outside of the support body 41. The biasing portion is biased in the arrow X direction in FIG. 21. Use of the pulling spring 51b2 eliminates the need for the kick spring 512. The other end portion 48 of the support body 41 has the shaft hole 472 to insert the positioning protrusion 2c2 for disposing the support body 41 onto the housing 2a of the exposure unit 2.

The color image forming apparatus according to the present invention where Embodiments 1 and 2 are described as examples may be applied to an image forming apparatus such as a copier, a printer, and a facsimile machine. While in Embodiments 1 and 2, the exposure unit 2, which is the light scanning device, is applied to the image forming apparatus 1, this should not be construed in a limiting sense. Any other configuration is possible insofar as this apparatus requires the light scanning device. For example, a display device that displays data such as image data using a laser beam is also possible.

The present invention can be embodied and practiced in other different forms without departing from the spirit and essential characteristics of the present invention. Therefore, the above-described embodiments are considered in all respects as illustrative and not restrictive. The scope of the invention is indicated by the appended claims rather than by the foregoing description. All variations and modifications falling within the equivalency range of the appended claims are intended to be embraced therein. The present invention is applicable to a light scanning device.

What is claimed is:

1. A light scanning device for irradiating a scan object with a laser beam that is emitted from a laser emitting portion and reflected on a rotating polygon mirror via an optical member having a long axis in a main-scanning direction, the optical member being mounted on a housing of the light scanning device so that one end of the optical member is an axis around which the other end portion of the optical member is turnable, the light scanning device comprising an adjusting unit configured to turnably displace the other end portion of the optical member to adjust an optical axis of the laser beam, wherein the adjusting unit includes:
a shaft portion configured to bidirectionally move in a first direction and in a second direction while turning, the first direction being a direction where the shaft portion approaches the optical member, the second direction being a direction where the shaft portion moves away from the optical member;
a shaft supporting portion that is secured to the housing of the light scanning device and that is configured to support the shaft portion, and move the shaft portion in accordance with turning of the shaft portion;
a turning portion configured to turn the shaft portion;
a driving portion configured to turn the turning portion; and
a turning damping unit configured to damp a turning force, the turning force being applied to the shaft portion by an external force, wherein
the light scanning device is configured to turnably displace the other end portion of the optical member in accordance with movement of the shaft portion in the first direction or the second direction.

2. The light scanning device according to claim 1, wherein the shaft portion includes a screw portion with a screw groove,
the shaft supporting portion includes a screw portion that fits the screw portion of the shaft portion, and
the screw portion of the shaft portion and the screw portion of the shaft supporting portion constitute the turning damping unit.

3. The light scanning device according to claim 1, wherein the turning portion includes:
a first turning portion configured to have a turning axis that is the shaft portion, and to engage the shaft portion to turn the shaft portion; and
a second turning portion configured to have a turning axis intersecting with the turning axis of the first turning portion, and to turn the first turning portion,
the driving portion turns the second turning portion, and
the first turning portion and the second turning portion constitute the turning damping unit.

4. The light scanning device according to claim 1, wherein
the driving portion includes a driving shaft, and
the turning portion includes:
- a first turning portion configured to have a turning axis that is the shaft portion, and to engage the shaft portion to turn the shaft portion; and
- a coupling portion that couples a turning shaft of the first turning portion to the driving shaft of the driving portion, wherein the first turning portion and the coupling portion constitute the turning damping unit.

5. The light scanning device according to claim 1, wherein
the optical member has one end portion and another end portion, the other end portion side being turnable around the one end portion side as an axis, and
the shaft portion is in contact with the other end portion side of the optical member, the optical member being displaced in accordance with movement of the shaft portion in the first direction or the second direction.

6. The light scanning device according to claim 1, further comprising
a restricting portion configured to restrict the optical member to be displaced in a direction other than a pre-set direction.

7. The light scanning device according to claim 1, further comprising
a support body where the optical member is mounted, wherein
the support body has a cutout portion that fits the shaft portion, and
the shaft portion has a depressed portion that turnably fits the cutout portion of the support body.

8. An image forming apparatus comprising
the light scanning device according to claim 1.

* * * * *